United States Patent
McCall et al.

(10) Patent No.: US 6,459,990 B1
(45) Date of Patent: Oct. 1, 2002

(54) SELF-CONTAINED POSITIONING METHOD AND SYSTEM THEREOF FOR WATER AND LAND VEHICLES

(75) Inventors: Hiram McCall; Ching-Fang Lin, both of Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 46 days.

(21) Appl. No.: 09/669,185

(22) Filed: Sep. 25, 2000

Related U.S. Application Data

(60) Provisional application No. 60/155,989, filed on Sep. 23, 1999.

(51) Int. Cl.[7] .............................................. G06F 15/50
(52) U.S. Cl. ....................... 701/220; 701/207; 701/21; 701/221; 73/178 R
(58) Field of Search ................................. 701/220, 221, 701/207, 21; 73/178 R

(56) References Cited

U.S. PATENT DOCUMENTS

| | | | | |
|---|---|---|---|---|
| 4,254,465 A | * | 3/1981 | Land | 244/175 |
| 5,272,639 A | * | 12/1993 | McGuffin | 342/63 |
| 5,297,050 A | * | 3/1994 | Ichimura et al. | 340/989 |
| 5,789,671 A | * | 8/1998 | Fernandez | 33/324 |
| 5,912,643 A | * | 6/1999 | Chew et al. | 342/457 |
| 5,941,935 A | * | 8/1999 | Fernandez | 701/220 |

\* cited by examiner

Primary Examiner—Michael J. Zanelli
Assistant Examiner—Eric M Gibson
(74) Attorney, Agent, or Firm—Raymond Y. Chan; David and Raymond Patent Group

(57) ABSTRACT

A positioning method and system for water and land vehicles is disclosed for highly accurate and self-contained operation. In which, an inertial navigation system (INS) is built on the micro MEMS (MicroElectroMechanicalSystem) IMU that is the core of the position determination system. To compensate the error of the INS, multiple navigation sensors are integrated into the system. The magnetic sensor is used as a magnetic field sensor to measure the heading of the vehicle. The odometer is used to measure the distance when the vehicle is on land. An automated Zero velocity updating method is used to calibrate the ever increasing INS errors. When the vehicle is in the water, a velocimeter is used to measure water speed for the INS aiding.

27 Claims, 17 Drawing Sheets

SELF-CONTAINED POSITIONING METHOD AND SYSTEM THEREOF FOR WATER AND LAND VEHICLES

CROSS REFERENCE OF RELATED APPLICATION

This is a regular application of a provisional application having an application Ser. No. of 60/155,989, filed on Sep. 23, 1999.

This invention was made with Government support under Contract No. M67854-00-C0023 awarded by the U.S. Marine Corps Systems Command, AAAV Technology Center, 991 Annapolis Way, Woodbridge, Va. 22191-1215. The Government was certain rights in the invention.

BACKGROUND OF THE PRESENT INVENTION

1. Technical Field
2. Field of the Present Invention

The present invention relates to a positioning method and system for land and water vehicles, and more particularly to a self-contained positioning method and system for land and water vehicles, wherein output signals of an inertial measurement unit, an odometer, a velocimeter, and a magnetic sensor are processed to obtain highly accurate position measurements of a vehicle on land and in water.

3. Description of Related Arts

Nowadays, GPS (Global Positioning System) is the most accurate navigational system available for commercial uses. The GPS is a satellite radio-navigation system, which is owned, deployed, and operated by the U.S. Department of Defense, but is available for commercial uses around the world.

GPS has 21 GPS satellites and three spare satellites in orbit at 10,600 miles from the Earth. The satellites are spaced so that from any point on Earth, four satellites will be visible above the horizon. Any GPS receiver on ground, air, and near space contains a microprocessor that "triangulates" its own position by getting bearings and ranges from four GPS satellites. The result is provided in form of a geographic position—longitude and latitude as well as altitude—within 100 meters accuracy, for most receivers.

A conventional, single-antenna, typical GPS receiver can supply world-wide highly accurate three dimensional position, velocity and timing information, but not attitude, by processing so-called pseudo-range and pseudo-range rate from individual code tracking loops and carrier tracking loops respectively. In benign radio environment, the GPS navigation errors are bounded primarily by the GPS signal propagation and satellite errors.

Unfortunately, GPS is vulnerable to jamming and shadowing, especially on land and in water, so that a GPS receiver is not often able to provide continuous positioning information.

An inertial navigation system is a self-contained navigation system. But, the effectiveness of the inertial navigation system diminishes in land and water due to its positioning accuracy drift with time.

Therefore, it is very desirable to develop a positioning system, which can be used in areas where GPS signals are not available, such as buildings, tunnels, forested areas, and high Electronic Counter Measure (ECM) environments.

SUMMARY OF THE PRESENT INVENTION

The main objective of the present invention is to provide a self-contained positioning method and system to determine position of a vehicle on land and in water with high accuracy such as an accuracy of better than one percent of the distance traveled without using GPS or radar updates, wherein output signals of an inertial measurement unit, an odometer, a velocimeter, and a magnetic sensor are processed to obtain highly accurate position measurements of the vehicle on land and in water. The present invention functions as an integrated micro land and water navigator, which has the following unique features:

(1) Miniature, light weight, low power, low cost.

(2) MEMS IMU (MicroElectroMechanicalSystem Inertial Measurement Unit), odometer, velocimeter, and magnetic sensor.

(3) Integration filter for sensor data fusion and zero velocity updating.

Typical applications include automobiles, railway vehicles, miniature land vehicles, robots, unmanned ground vehicles, personal navigators, military land vehicles, and marine vehicles.

DETAIL DESCRIPTION OF THE PREFERRED EMBODIMENT

The present invention provides a self-contain positioning method and system for land and water vehicles, wherein output signals of an inertial measurement unit, an odometer, a velocimeter, and a magnetic sensor are processed to obtain highly accurate position measurements of the vehicle on land and in water.

Conventionally, an inertial navigation system (INS) is a self-contain system. However, a high accurate INS is too expensive to use in commercial applications. A low cost INS need GPS or radar updates to provide high accurate position information at cost of lack of the self-contained feature.

It is possible to build a low-cost, low-weight, and small-size integrated navigation system. In the present invention, an inertial navigation system is built on the micro MEMS IMU that is the core of a position determination system. To compensate the error of the INS, multiple navigation sensors are integrated into the system. A magnetic sensor is used as an Earth's magnetic field sensor to measure the heading of the vehicle. The odometer is used to measure the distance when the vehicle is on land. Zero velocity updating method is used to calibrate the ever increasing INS errors. When the vehicle is in the water, a velocimeter is used to measure water speed for the INS aiding.

Figure 1:
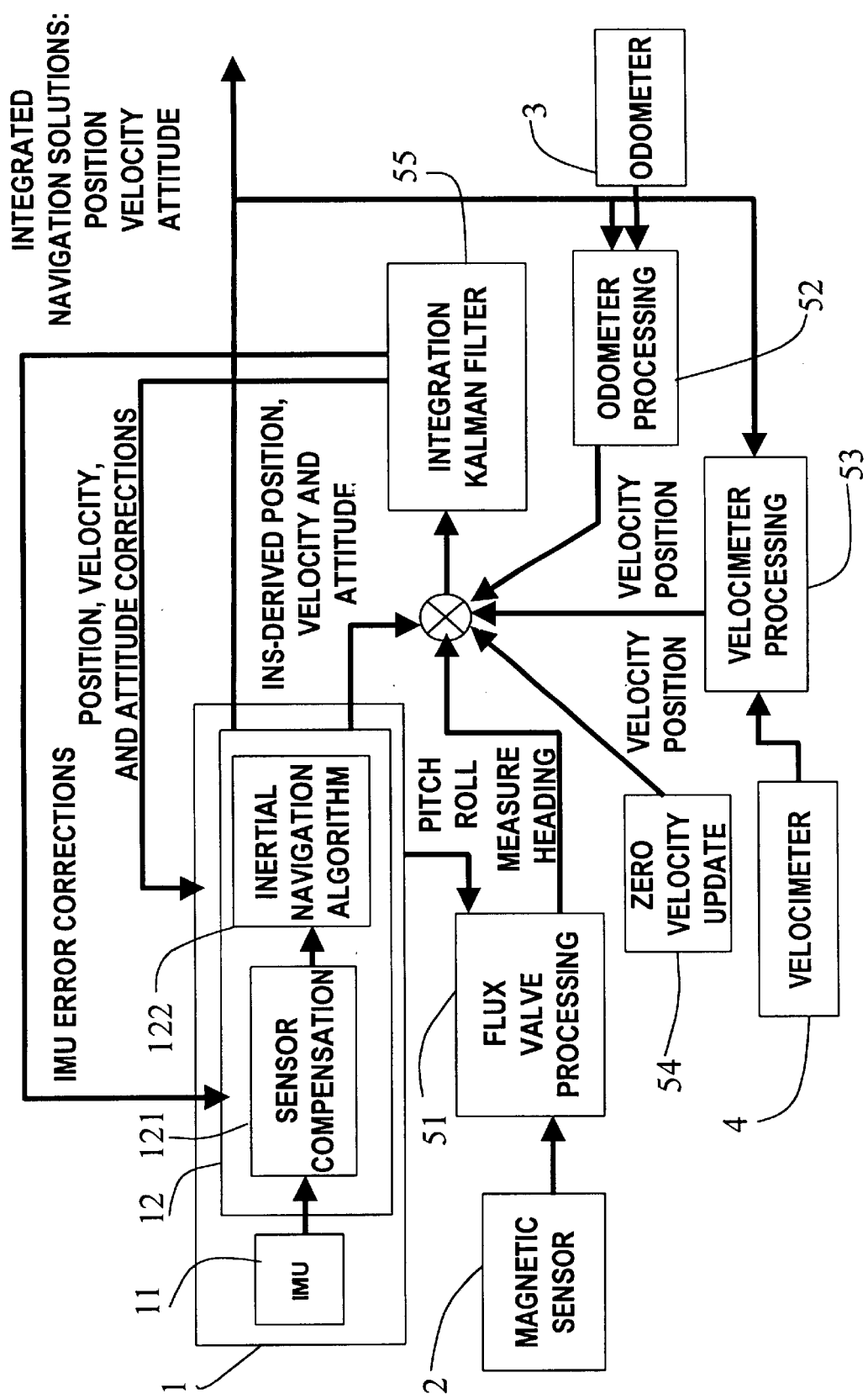
FIG. 1 is a block diagram illustrating system configuration of the present invention.

Referring to FIG. 1, the self-contain positioning system of the present invention, which is carried by a vehicle, comprises the following:

(1) an inertial navigation system (INS) 1, for sensing motion of the vehicle to output inertial positioning data including position, velocity, and attitude data and receiving an optimal estimates of the inertial positioning data from an integration processor 5 to output the compensated inertial positioning data;

(2) a magnetic sensor 2, such as a flux valve, for sensing an earth's magnetic field to measure a heading of the vehicle to output a magnetic heading measurement;

(3) an odometer 3, for measuring a distance traveled when the vehicle is on land;

(4) a velocimeter 4, for measuring a vehicle speed when the vehicle is in water; and (5) an integration processor 5, for deriving optimal estimates of the inertial positioning data by integrating the inertial positioning data, the magnetic heading measurement, the distance traveled, and vehicle speed, and feeding back the optimal estimates of the inertial positioning data to the inertial navigation system (INS) 1 to calibrate the ever increasing inertial positioning errors.

Referring to FIG. 1, the inertial navigation system (INS) 1 comprises an inertial measurement unit (IMU) 11 and an INS processor 12.

The inertial measurement unit (IMU) 11 is used to sense motion of the vehicle to output digital angular increments and velocity increments signals in response to the vehicle motion.

The INS processor 12 is designed to receive the digital angular increments and velocity increments signals from the IMU and an optimal estimates of the inertial positioning data from the integration processor to output the compensated inertial positioning data.

The inertial navigation system (INS) 1 based on the miniature MEMS IMU 11 is the core of the navigator for land and water vehicles. Based on the INS error model and other sensor error models, an multiple sensor integration Kalman filter is constructed to estimate and compensate the INS errors and sensor errors.

A low cost IMU, such as the AGNC (American GNC Corporation) developed IMU based on MEMS gyros and accelerometers, can be applied in the low cost navigator. The AGNC-designed MEMS gyros, referring U.S. patent application, MicroElectroMechanical System for Measuring Angular Rate, application Ser. No. 60/154,700, has the following unique features:

(a) Hinge to minimize number of resonance modes.
(b) Mass distribution for resonance mode linearity.
(c) Resonance mode locking circuitry.
(d) Displacement regulation for scale factor stability.
(e) Temperature stabilization for scale factor and bias stability.
(f) Low mechanical damping through moderate vacuum and unique getter placement.
(g) Pickoff circuitry to minimize bias and scale factor shift.

The application of the miniature IMU based AGNC designed MEMS gyros is one of the major features of the present invention. AGNC has made significant progress on the development of the MEMS inertial sensor.

A detailed dynamic system model is established for the integration Kalman filter design and simulation. A linear time varying dynamic system model is built to represent the characteristics of an integrated navigation system when the vehicle is in motion. The odometer data processing method is designed. Based on the system model, an integration Kalman filter structure is designed and analyzed.

Although the magnetic sensors are sometime sensitive to external interference, the utilization of the advanced electronics and computer compensation approach can make it accurate enough for use in the low cost integrated navigator.

While the INS provides a self-contained, non-radiating, and deterministic means for three-dimensional navigation with accurate short-term position information, it also exhibits an unbounded mean position error due to uncompensated gyro and accelerometer errors, especially for low cost strap-down micro MEMS IMU based INS systems. The external aiding information must be provided to enhance the long-term accuracy of the system.

The integrated system of the present invention is to determine the position of the vehicle both on land and in water. Multiple navigation sensors are use to aid the core INS. During land navigation, the Micro MEMS IMU is aided with the odometer to enhance position accuracy. Magnetic sensor aiding is used for heading updates. Zero velocity updating is used to suppress the error growth of the INS. During marine navigation, magnetic sensor aiding is still used to obtain accurate heading measurements. Zero velocity updating in water is applied when anchorage is available. Velocimeter is utilized for water speed measurement, which is used for external speed aiding.

Figure 2:
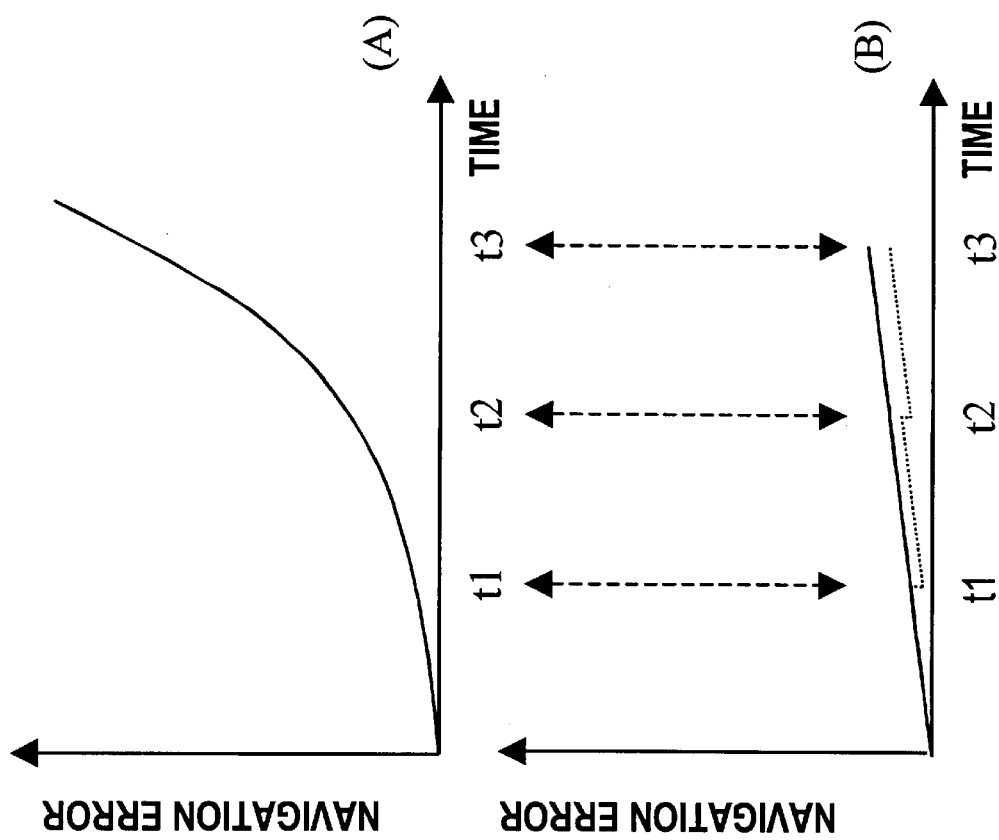
FIG. 2 shows characteristics comparison of the pure INS and integrated system.

FIG. 1 shows the block diagram of the system of the present invention. One of the key technologies in the present invention is the use of automated zero-velocity updates in the navigation algorithm to greatly reduce the accumulated navigation error. The position error of a dead-reckoning inertial navigation system (INS) increases with time with a pattern shown in FIG. 2(A), in which the conclusion can be made that the navigation error is nonlinearly increasing with time. The zero-velocity update technology uses the additional zero velocity source to reset the velocity measurement of the navigator when the vehicle stops. The periodic zero-velocity reset leads to a navigation error pattern shown in FIG. 2(B).

An optimal estimator or Kalman filter is used to estimate the errors in the navigator and modify the navigation parameters to compensate the errors. This method is effective to compensate for currents and drifts during marine navigation, to maintain a navigation accuracy of better than 1% of distance traveled.

Figure 3:
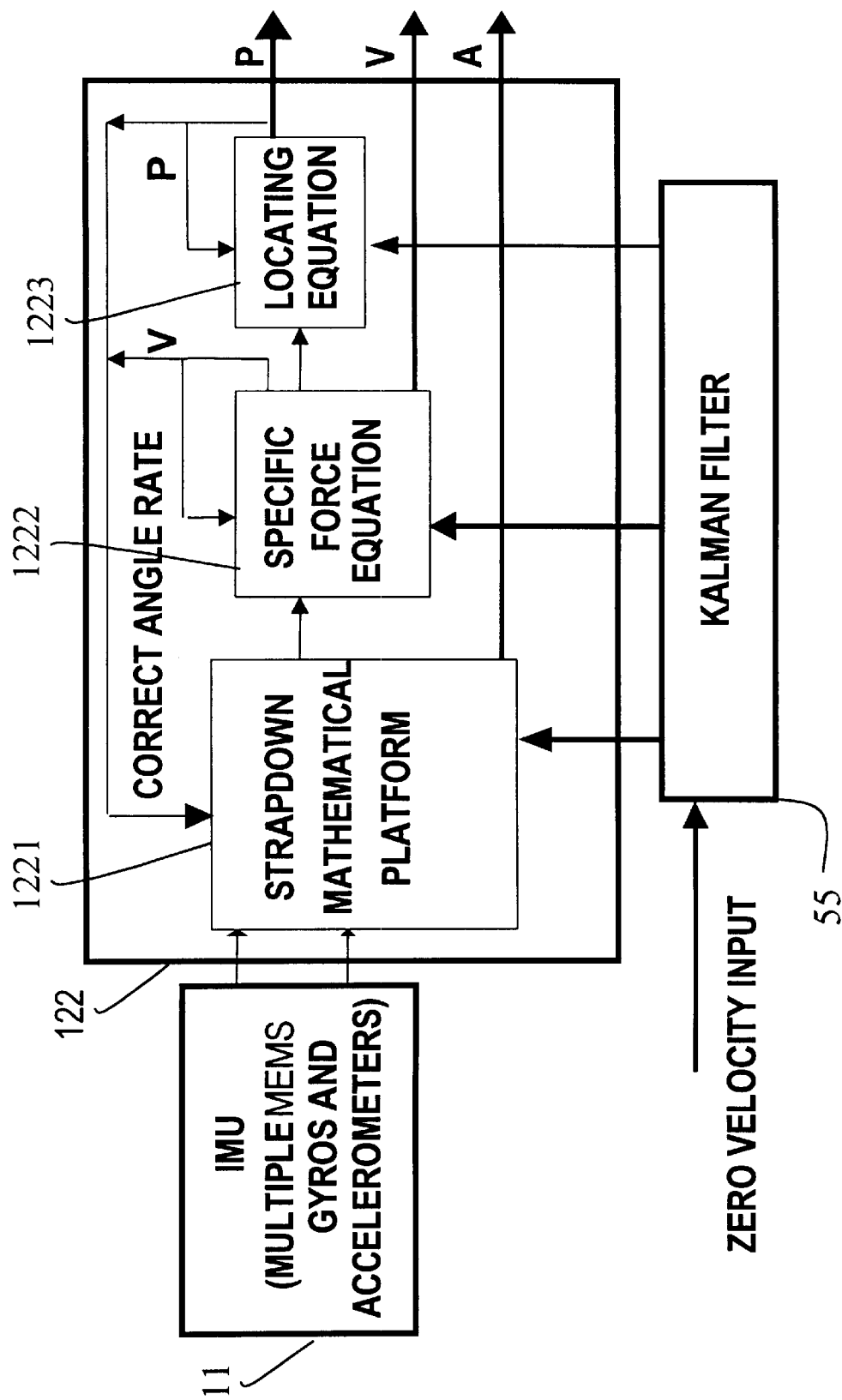
FIG. 3 is a block diagram illustrating Kalman Filter estimate and correction.

Referring to FIG. 1 and 3, the INS processor 12 includes a sensor compensation module 121, for calibrating the error of the digital angular increments and velocity increments signals, and an inertial navigation algorithm module 122, for computing the position data.

Because the installation of the gyros and the accelerometers in an IMU are not precisely in three orthogonal directions, the IMU must be calibrated before it is applied to a practical system.

In the micro MEMS IMU, the gyros and the accelerometers are not precisely installed. The IMU must be calibrated for the non-orthogonal errors, the sensitivity to forces, and bias before it is used in a practical system.

Micromachined inertial sensors offer tremendous cost, size, and reliability improvements for guidance, navigation, and control systems. In the near future, the MEMS sensors will find wide application in both the military sector and the commercial world. In Micro MEMS IMU modeling, we specifically devise a corresponding software module for the MEMS IMU error compensation. Currently, the Micro MEMS IMU is an assembly of low accuracy micromachined silicon gyros and accelerometers. Because the MEMS sensor is very sensitive to temperature and acceleration, in the software design, a set of special modules is devised.

The simplified error compensation for the MEM gyro is expressed as:

$$\epsilon = \epsilon_{drift} + \epsilon_{misalign} + \epsilon_{nonorth} + \epsilon_{scale} + \epsilon_g + \epsilon_{random} + \epsilon_t(T)$$

This error compensation for the MEM IMU errors is explained as follows.

(1) Stability error $\epsilon_{drift}$, also denoted as drift. Since the time constant is large for the MEM gyro stability error, this effect is modeled as a constant bias.

(2) Misalignment error $\epsilon_{misalign}$. This error deals with the imprecision in mounting the assembled MEM IMU unit onto the vehicle. Misalignment is the difference between the actual orientation of the device sensitive axis and the intended orientation of that axis. This is a constant angular error and is normally kept small by precision mounting and calibrating techniques during installation.

(3) Non-Orthogonal error $\epsilon_{nonorth}$. This error refers to imprecision in assembling the MEMS IMU unit itself. The IMU consists of three micro gyros which are mounted perfectly along three orthogonal axes. Non-orthogonal error results when one gyro input axis leans into the plane containing the remaining two gyro input axes. This non-orthogonal gyro detects a component of the angular rate about the other axes.

(4) Scale factor error $\epsilon_{scale}$. This error is calculated as a percentage of the true angular rate sensed by the MEM rate gyro. Scale factors produce an error in the measured angular rate of a magnitude that is proportional to the true angular rate being measured. Scale factor errors can be caused remarkable navigation errors at high angular rates.

(5) G sensitive error $\epsilon_g$. Gyro output variation due to accelerations incident on the device is called g-sensitive error. This produces a rate bias error proportional to the amount of specific force in a maneuver. The specific force is equal to the inertial acceleration of a body minus the gravitational acceleration.

(6) Random walk $\epsilon_{random}$. MEMS gyros are noisy sensors. In the inertial navigation system, the micro gyro acts as an integrator of the sensed angular rate. The actual sensor output of $\Delta\theta$ integrates the noise in the gyro output to produce a smoother signal that randomly wanders through a certain range of errors. Angle random walk is estimated by the compensation processing.

(7) Temperature sensitivity $\epsilon_t(T)$. The MEMS gyro is very sensitive to temperature change. It can even be regarded as a good thermometer. The temperature induced error must be removed by the navigation algorithm in the INS. Thus, in the IMU error processing, we must provide a temperature term which can produce the error data according to the temperature changes during system operation.

Similarly, the error compensation for the MEM accelerometer is expressed as:

$$\nabla = \nabla_{drift} + \nabla_{misalign} + \nabla_{nonorth} + \nabla_{scale} + \nabla_g + \nabla_{random} + \nabla_t(T)$$

The definition of the error terms in this accelerometer are also similar to that of the MEMS gyro.

Figure 9:
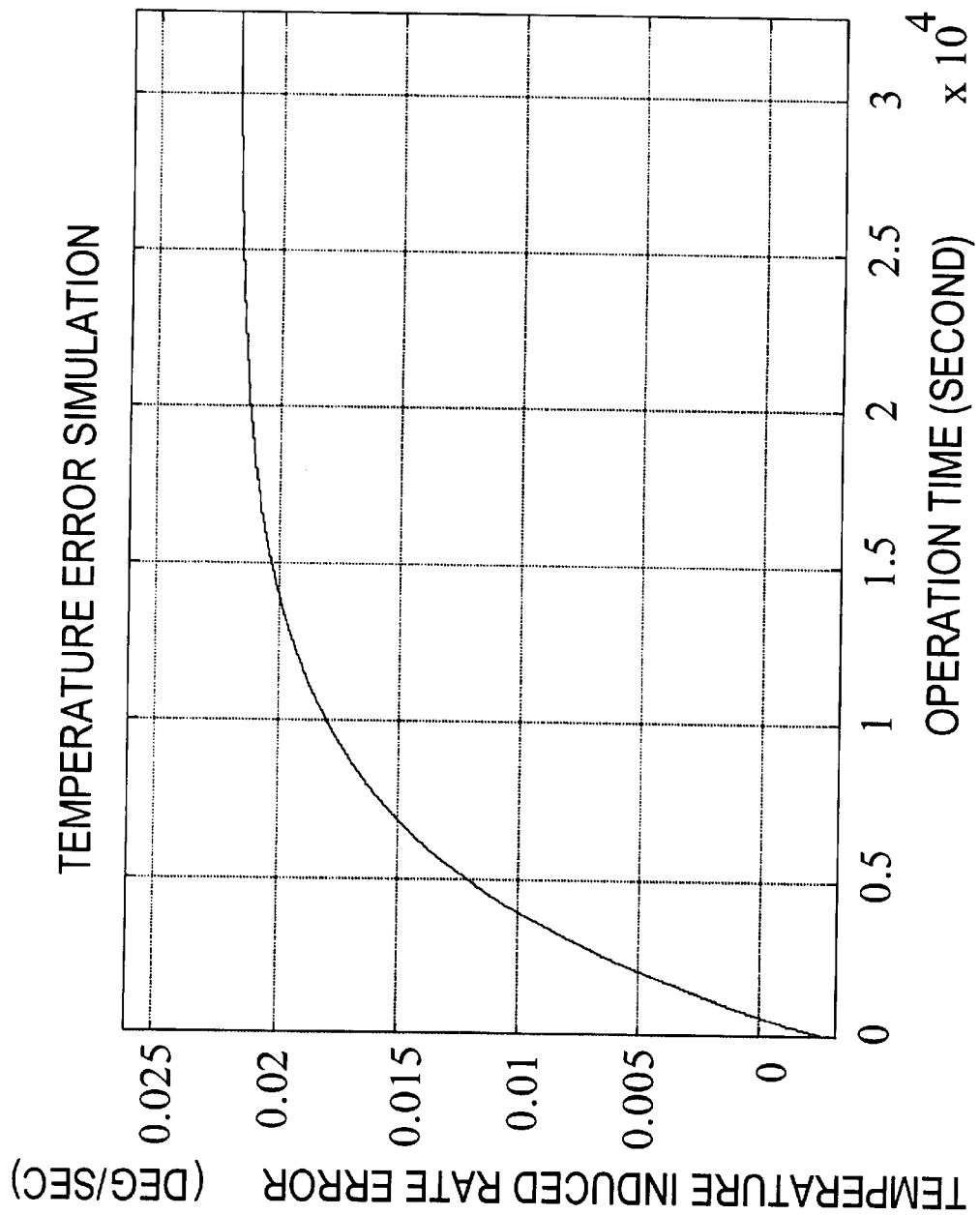
FIG. 9 shows characteristics of temperature induced error of a MEMS gyro.

In practice the temperature change of an IMU can be approximately described by the first order differential equation $$T' = -\frac{1}{t_c}(T - T_{bal})$$

$$T(0) = T_0$$

where T represents the IMU temperature, $T_0$ is the initial temperature, $t_c$ is the time constant, and $T_{bal}$ is the balance temperature of the IMU. Parameters $t_c$ and $T_{bal}$ are determined by the heat transfer properties of the IMU and the environmental temperature, which can be found by calibration. The temperature induced error can be expressed as $$\epsilon_t = K_t(T - T_{nom})$$

where $T_{nom}$ is the nominal temperature at which the IMU is calibrated and $K_t$ is the temperature error factor. FIG. 9 shows a typical temperature induced error of a MEMS gyro.

Referring to FIG. 3, the inertial navigation algorithm module 122 further comprises:

a strapdown mathematical platform computation module 1221, for computing a transformation matrix from a body frame to navigation frame using the digital angular increments and extracting attitude angles from the transformation matrix and compensating errors of the attitude angles using the optimal estimates of errors of the inertial attitude data;

a specific force equation module 1222, for transforming the digital digital velocity increments expressed in the body frame to navigation frame using the transformation matrix and computing inertial velocity data and compensating errors of the inertial velocity data using the optimal estimates of errors of the inertial velocity data; and a location equation module 1223, for integrating the inertial velocity to obtain inertial positioning data and compensating errors of the inertial positioning data using the optimal estimates of errors of the inertial positioning data.

In the strapdown INS, a mathematical frame (or an imaginary frame) is introduced, which emulates the motion of a level platform, so it is also called the platform frame and denoted by P. The vehicle velocity relative to the earth is represented in this mathematical frame. Written in the compact vector form, the velocity integration equation of the strapdown INS can be expressed as follows:

$$V' = f^P + G^P - (\omega_{ep}^P + 2\Omega_{ie}^P) \times V$$

where V is the vehicle velocity relative to the earth, represented in the P frame.

$f^P$ is the specific force represented in the P frame, or the accelerometer output transformed to the mathematical platform.

$G^p$ is the gravitational acceleration represented in the P frame.

$\omega_{ep}^p$ is the angular velocity of the mathematical platform with respect to the earth frame expressed in the P frame.

$\Omega_{ie}^p$ is the earth rate represented in the P frame.

In order to obtain a definite velocity equation for the INS, we have to first define the motion of the mathematical platform.

The P frame in the strapdown INS is a level platform, so its angular position with respect to the local geographical frame (N frame) can be described by an azimuth angle $\alpha$. The angular velocity of the platform with respect to the inertial frame can be expressed as:

$$\omega_{ip}^p = \omega_{np}^p + C_n^p \omega_{en}^n + C_n^p \Omega_{ie}^n$$

where $\omega_{np}^p$ is the angular velocity of the P frame with respect to the N frame;

$C_n^p$ is direction cosine matrix of the P frame relative to the N frame; and $\omega_{en}^n$ is the angular velocity of the local geographical frame (N frame) with respect to the earth frame (E frame).

Since the P frame is a mathematical platform, we are able to define its motion. Based on above equation, we can obtain an equation to describe the motion of the P frame relative to the N frame:

$$\omega_{ipz}^p = \alpha^* + \frac{tg\varphi}{R_n + h} v_x^n + \Omega \sin\varphi$$

We can define $\omega_{ipz}^p$ to obtain different mechanizations for the INS. In analogy to the gimbaled INS, we can let $\omega_{ipz}^p = 0$ to have a so-called free-azimuth system, or let $\omega_{ipz}^p = \Omega \sin\phi$ to have a so-called wander-azimuth system. Thus, we have the motion of the mathematical platform defined.

For the free-azimuth system $$\alpha^* = -\frac{tg\varphi}{R_n + h} v_x^n - \Omega \sin\varphi$$

For the wander-azimuth system $$\alpha^* = -\frac{tg\varphi}{R_n + h} v_x^n$$

As long as the motion of the P frame is defined, we arrive at a definite velocity equation for the strapdown INS. Further, we can obtain a third-order, nonlinear, time-varying, ordinary differential equation as the INS velocity equation.

Expressed in geographical latitude and longitude, the position integration equation of the INS is written as $$\varphi^* = \frac{v_y^n}{R_m + h} = \frac{1}{R_m + h}(v_x \sin\alpha + v_y \cos\alpha)$$

$$\lambda^* = \frac{v_x^n}{(R_n + h)\cos\varphi} = \frac{1}{(R_n + h)\cos\varphi}(v_x \cos\alpha - v_y \sin\alpha)$$

It is noted that the longitude equation has a singularity at the earth's two poles. The longitude computation becomes difficult in the polar areas. In practice, if the polar area navigation or simulation is required, we can introduce other position representation variables. For example, we can use the direction cosine matrix of the N frame relative to the earth frame (ECEF frame), $C_e^n$, as the position variable. Then, the position equation is expressed as:

$$\dot{C}_e^n = [\omega_{en}^n] C_e^n$$

This is a matrix differential equation. Where $[\omega_{en}^n]$ is the skew-symmetric matrix corresponding to the vector $\omega_{en}^n$. This differential equation has no singular point and from the $C_e^n$. We can calculate the position represented in latitude and longitude. In this equation, however, the $C_e^n$ has 9 elements but 3 degrees-of-freedom. Thus in the computation a normalization procedure is required to keep the $C_e^n$ normalized. That is, at every integration step, we modify $C_e^n$, making it to satisfy $$C_e^n C_e^{nT} = I$$

If we regard the INS velocity equation as a nonlinear, time-varying system, the specific force in the P frame, $f^p$, and the gravitational acceleration, $G^p$, can be regarded as the inputs to the system. If we ignore the gravity anomaly, the gravitational acceleration can be represented as $$G^p = \begin{bmatrix} 0 \\ 0 \\ g \end{bmatrix}$$

where g is the normal gravity that can be expressed as $$g = g_0 \left[1 - 2A\left(\frac{h}{a}\right) + B\sin^2\varphi\right]$$

where A=1+f+m

B=2.5 m−f f=flattening of the reference ellipsoid m=$\Omega^2 a^2 b / GM$ $g_0$=equatorial gravity h=altitude M mass of the earth G gravitational constant The specific force in the P frame, $f^p$, is the actual accelerometer output transformed into the mathematical platform:

$$f^p = C_b^p f^b$$

where $f^b$ is the accelerometer output vector or the specific force represented in the IMU frame (or the body frame). To carry out this transformation, the direction cosine matrix $C_b^p$ must be known. That is, the attitude of the IMU frame must be obtained. In the strapdown INS, the attitude is obtained from the high-speed computation. It is through the attitude computation and coordinate system transformation, that the so-called mathematical platform is established. In the implementation of the strapdown INS, the attitude computation is the most critical issue.

In principle, there are many kinds of parameters used to represent the attitude of a rigid body. For example, Euler angles, direction cosine matrix, quaternion, Euler parameters, etc. In practice, the direction cosine matrix and the quaternion are the most frequently used attitude representations in the analysis and computations. Represented with the direction cosine matrix, the attitude differential equation is written as:

$$\dot{C}_p^b = [\omega_{pb}^b] C_p^b$$

This is a matrix differential equation. $[\omega_{pb}^b]$ is the skew-symmetric matrix corresponding to the vector $\omega_{pb}^b$ that is determined by the following equation:

$$\omega_{pb}^b = \omega_{ib}^b - \omega_{ip}^b$$
$$= \omega_{ib}^b - C_p^b(\omega_{ep}^p + C_n^p \Omega_{ie}^n)$$
$$= \omega_{ib}^b - C_p^b \omega_{ip}^p$$

where $\omega_{ib}^b$ is the output of the gyros in the IMU or the IMU angular velocity with respect to the inertial space represented in the IMU frame itself.

We can see that the attitude equation is a $9^{th}$-order, nonlinear, time-varying ordinary differential equation. In this equation, however, the $C_p^b$ has 9 elements but 3 degrees-of-freedom. Thus in the computation a normalization procedure is required to keep the $C_p^b$ normalized. That is, in every integration step, we modify $C_p^b$, making it satisfy $$C_p^b C_p^{bT} = I.$$

The quaternion representation is often used in the attitude computation because of its conciseness and efficiency. The quaternion attitude equation is expressed as:

$$\lambda^{\mathsf{s}} = \frac{1}{2}\omega\lambda$$

where $\lambda$ is the quaternion expressed in the column matrix form and $\omega$ is the 4×4 matrix determined by the angular velocity $\omega_{pb}^b$.

$$\lambda = \begin{bmatrix} \lambda_0 \\ \lambda_1 \\ \lambda_2 \\ \lambda_3 \end{bmatrix}$$

$$\omega = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix}$$

The quaternion has 4 parameters to represent the body attitude, while a rigid body has only 3 degrees-of-freedom. Thus, the components of the quaternion are constrained by the relationship:

$$\lambda_0^2 + \lambda_1^2 + \lambda_2^2 + \lambda_3^2 = 1$$

The quaternion satisfying this equation is called normalized. In the integration of the attitude equation, the normalization of the quaternion is also very simple. The relation between the quaternion and the direction cosine matrix is expressed as follows:

$$C_p^b = \begin{bmatrix} \lambda_1 \\ \lambda_2 \\ \lambda_3 \end{bmatrix} \begin{bmatrix} \lambda_1 & \lambda_2 & \lambda_3 \end{bmatrix} + \begin{bmatrix} \lambda_0 & \lambda_3 & -\lambda_2 \\ -\lambda_3 & \lambda_0 & \lambda_0 \\ \lambda_2 & -\lambda_0 & \lambda_0 \end{bmatrix}^2$$

To express the INS model in a compact form, we introduce a vector defined as:

$$X = \begin{bmatrix} V \\ \alpha \\ \varphi \\ \lambda \end{bmatrix} = \begin{bmatrix} v_x \\ v_y \\ v_z \\ \alpha \\ \varphi \\ \lambda \end{bmatrix}$$

Then, the INS computation model can be written as $$X^{\mathsf{s}} = F_x(X) + \begin{bmatrix} C_b^p f^b \\ O \end{bmatrix} + \begin{bmatrix} G^p \\ O \end{bmatrix}$$

Figure 4:
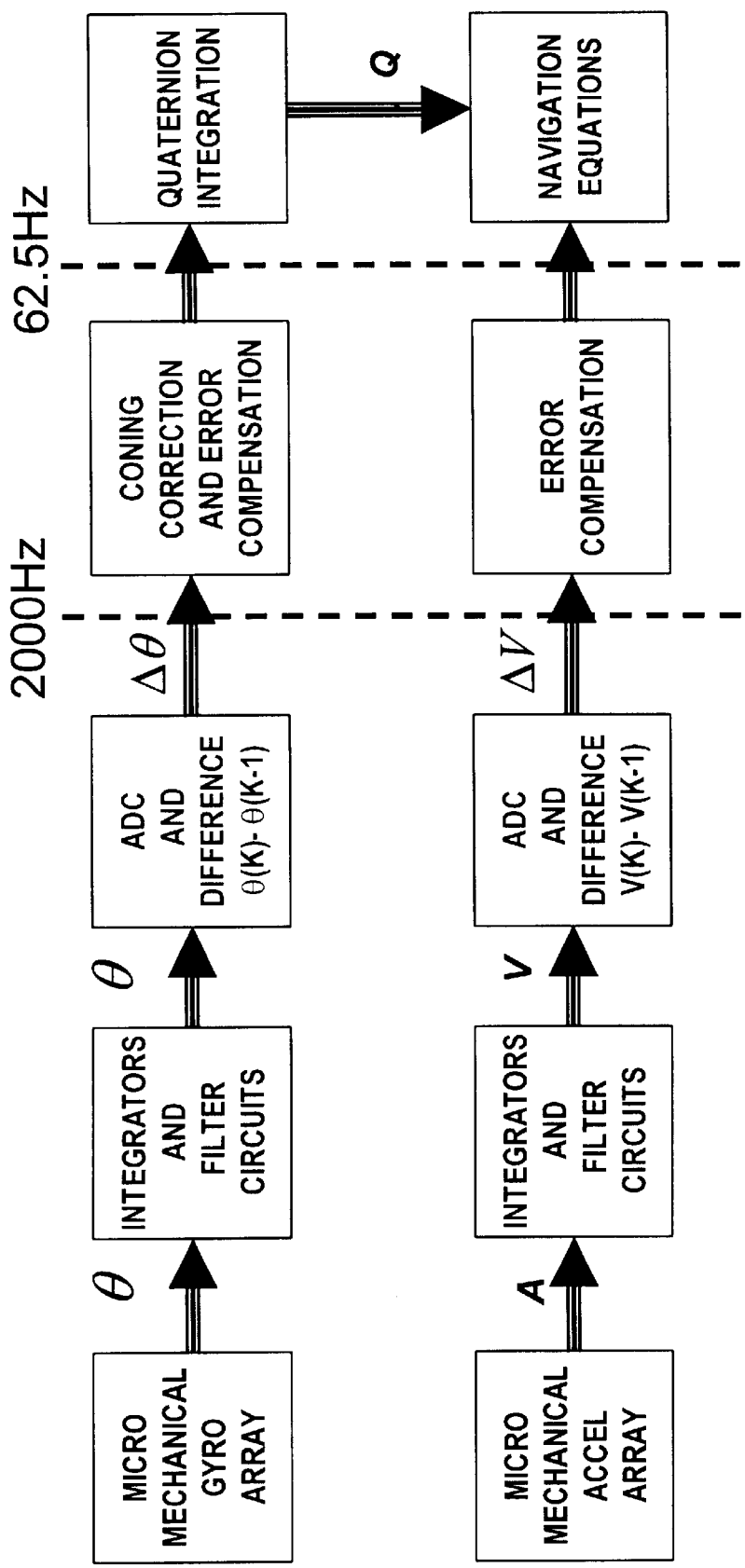
FIG. 4 is a block diagram illustrating Micro MEMS IMU.

$\omega_{ip}^p = F_\omega(X)$
$C_p^{\mathsf{s}} = [\omega_{pb}^b] C_p^b$
$\omega_{pb}^b = \omega_{ib}^b - C_p^b \omega_{ip}^p$ The preferred IMU is AGNC's coremicro™ IMU. FIG. 4 is a block diagram of the coremicro™ IMU and the INS processor. Three MEMS gyros are used to measure the angular velocity of the vehicle with respect to the inertial space expressed in the body frame. The out puts of the gyros are analog signals. Filters are used to suppress noise. In order to obtain a high accuracy high resolution A/D converter, an integrator controlled by the microprocessor is used to generate theta from angular rate. The analog thetas are then converted into digital delta thetas. The digital delta thetas are then incorporated into the navigation computation. The delta thetas are outputted at high speed—2000 Hz. After coning correction and error compensation, the delta thetas are used to solve the quaternion equation.

In the micro IMU, three accelerometers are used to measure the vehicle acceleration with respect to inertial space. But the actual output of the accelerometer is the specific force that is the combination of inertial acceleration and gravity. Gravity will be compensated in the navigation computation. The outputs of the accelerometers are also analog signals. After the signals are filtered to suppress noise, they are integrated during the sampling period to get velocities. The velocities are differentiated to obtain delta velocities, which are send into the navigation computer. After compensation for bias and scale factor errors, the delta velocities are used to solve the navigation equation.

Figure 5:
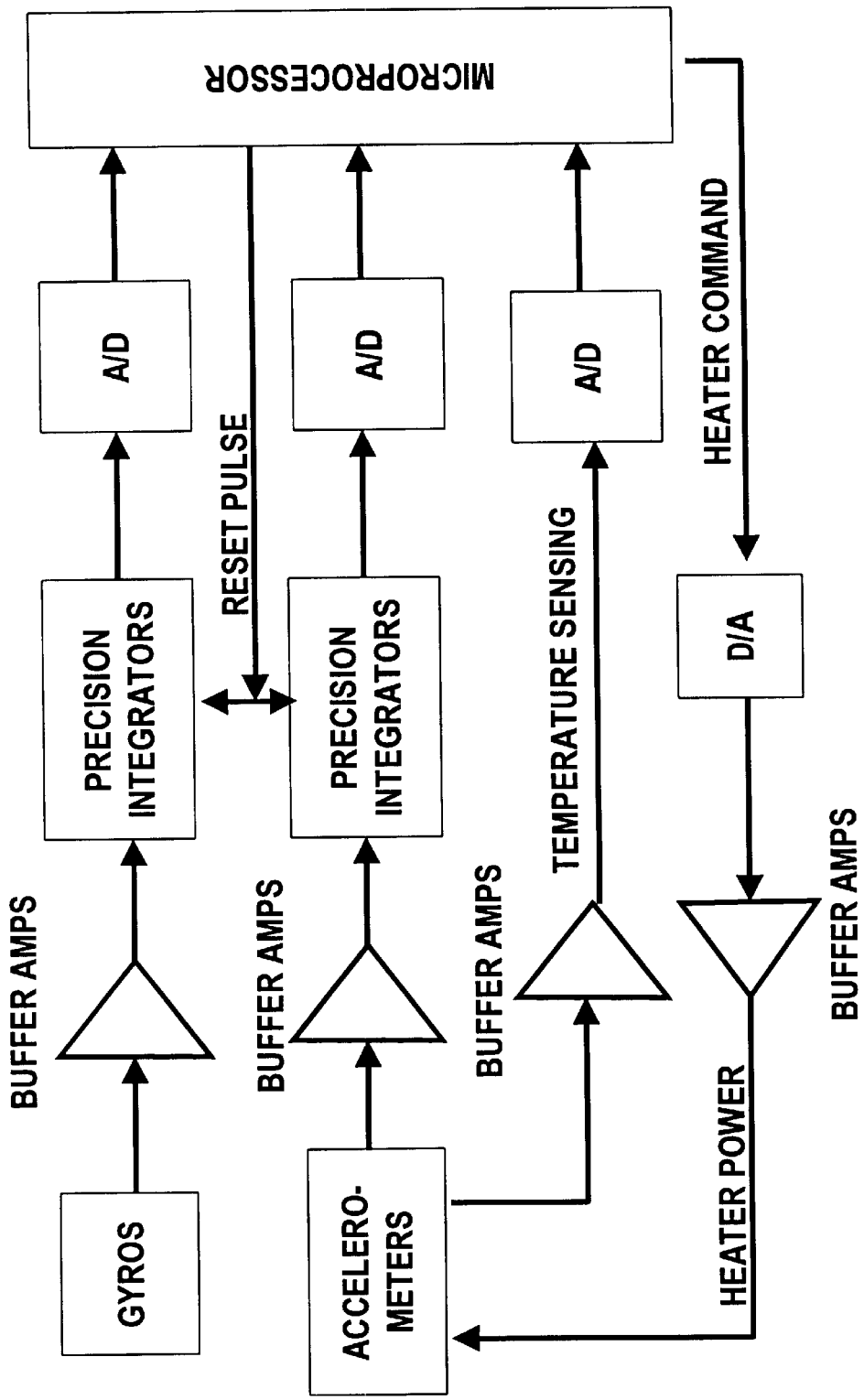
FIG. 5 is a block diagram illustrating Micro MEMS IMU signal processing circuitry.

FIG. 5 depicts the circuit design of the micro MEMS IMU and the INS processor. The outputs of the inertial sensors are analog signals. Buffer amplifiers are used to isolate the sensors from the microprocessor and adjust the scale factor of the gyros and accelerometers. Precision integrators are used to convert the angular velocities to delta thetas and specific forces to the delta velocities. The sampling of the integrators are controlled by the microprocessor to simplify the circuit design of the integrator controller. The analog delta thetas and delta velocities are converted to digital signal by A/D converters, thus providing an all digital interface to the user.

A temperature controller circuit is also included in the IMU signal processing. In order to obtain high precision in inertial sensor measurements and A/D conversion, the operational temperature of the IMU assembly must be stabilized. Electric heaters are placed on the sensors and circuitry to stabilize the assembly temperature at a point higher than the ambient temperature. The temperature control is also carried out by the microprocessor. Temperature sensors are already embedded in the gyros and we also put temperature sensors in the IMU block assembly. The temperature signals are amplified and converted to digital signals and fed into the microprocessor.

Referring to FIG. 1, the integration processor 5 further comprises:

a magnetic sensor processing module 51 for producing the heading angle;

an integration Kalman filter 55 for estimating errors of inertial positioning measurements by means of performing Kalman filtering computation to calibrate the inertial positioning measurement errors;

an odometer processing module 52 for producing relative position error measurements for the Kalman filter, a velocimeter processing module 53, for producing relative position error measurements for the Kalman filter, and a zero velocity update module 54 for determining if the vehicle stops automatically to perform zero velocity update of the Kalman filter.

Figure 6:
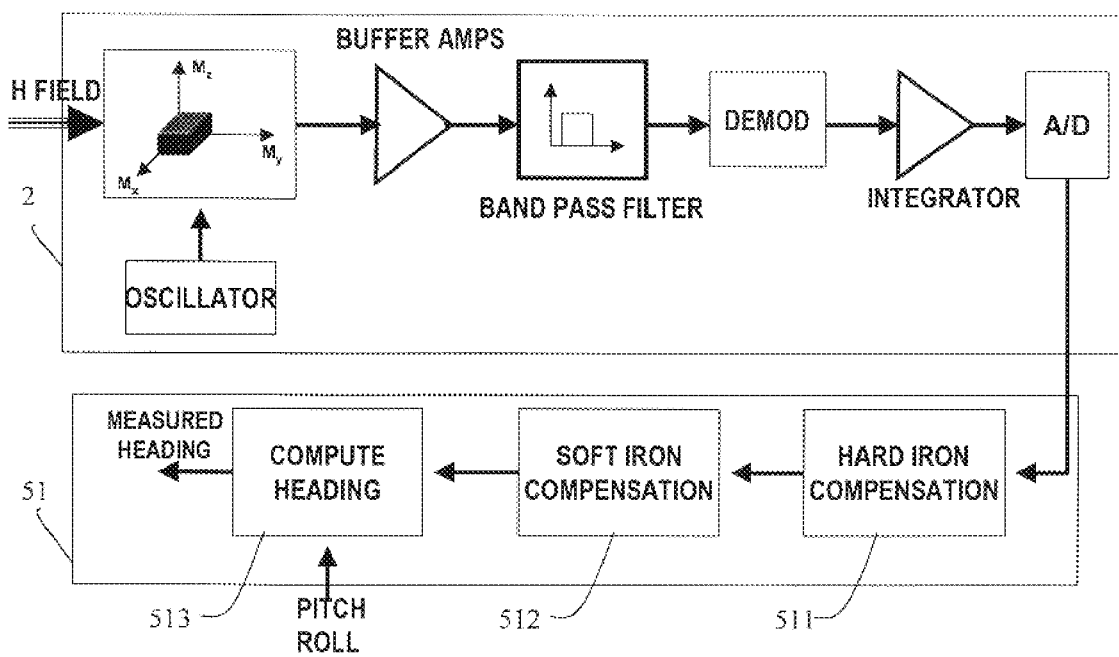
FIG. 6 is a block diagram illustrating processing of magnetic sensor signals.

FIG. 6 is a block diagram depicting the signal processing for the magnetic sensor, such as a flux valve. The flux valve detects the magnitude and direction of the earth's magnetic field and converts it to electrical information, which is used to obtain the magnetic north. In some case a single remote compensator can be used to compensate the flux valve by inserting small DC currents to cancel the errors caused by vehicle magnetic disturbances.

To obtain the true geodetic north, the flux valve is calibrated by using a table of the earth's magnetic field as a function of position. This data base can be obtained from the National Geodetic Survey. This data is used to compare the measured field strengths by rotation of the flux valve through various attitudes as measured by the calibration fixture. These measured field strengths are then used to compute the soft iron and the hard iron transformation matrices. These two matrices need to be calibrated every time a flux valve is serviced or repaired.

An alternative for the flux valve is the application of the magneto-inductive magnetic sensor technology. Magneto-Inductive magnetic sensors change inductance with different applied magnetic field strengths. This variable inductance property has been used to create very sensitive magnetic sensors that are low in cost and power. These sensors are the clear choice for a wide variety of applications.

Unlike mechanically gimbaled 2-axis flux gates, the Magneto-Inductive magnetic sensor has no mechanical moving parts. The use of 3 single-axis magnetometers and a 2-axis tilt sensor allows the Magneto-Inductive magnetic sensors to be gimbaled electronically. Electronic gimbaling is a solid-state solution to compass tilt compensation that eliminates all moving parts and mechanical impediments to performance. This advanced electronic gimbaling allows for tilt ranges of up to 80 degrees and provides superior performance over the entire tilt range in real world conditions.

In addition to compass heading, the Magneto-Inductive magnetic sensor also supplies highly accurate pitch and roll magnetic field data and temperature information, allowing the Magneto-Inductive magnetic sensors to replace several sensors within a system.

Ferrous metals in host systems often magnetize over time, misdirecting magnetic compass readings. In addition, some systems also generate soft iron distortions. Soft iron can either misdirect or magnify existing magnetic fields, making calibration extremely difficult. The Magneto-Inductive magnetic sensor uses advanced electronics and correction algorithms to counter the effects of hard and soft iron, enabling it to maintain a high degree of accuracy even in the most demanding environments.

Figure 13:
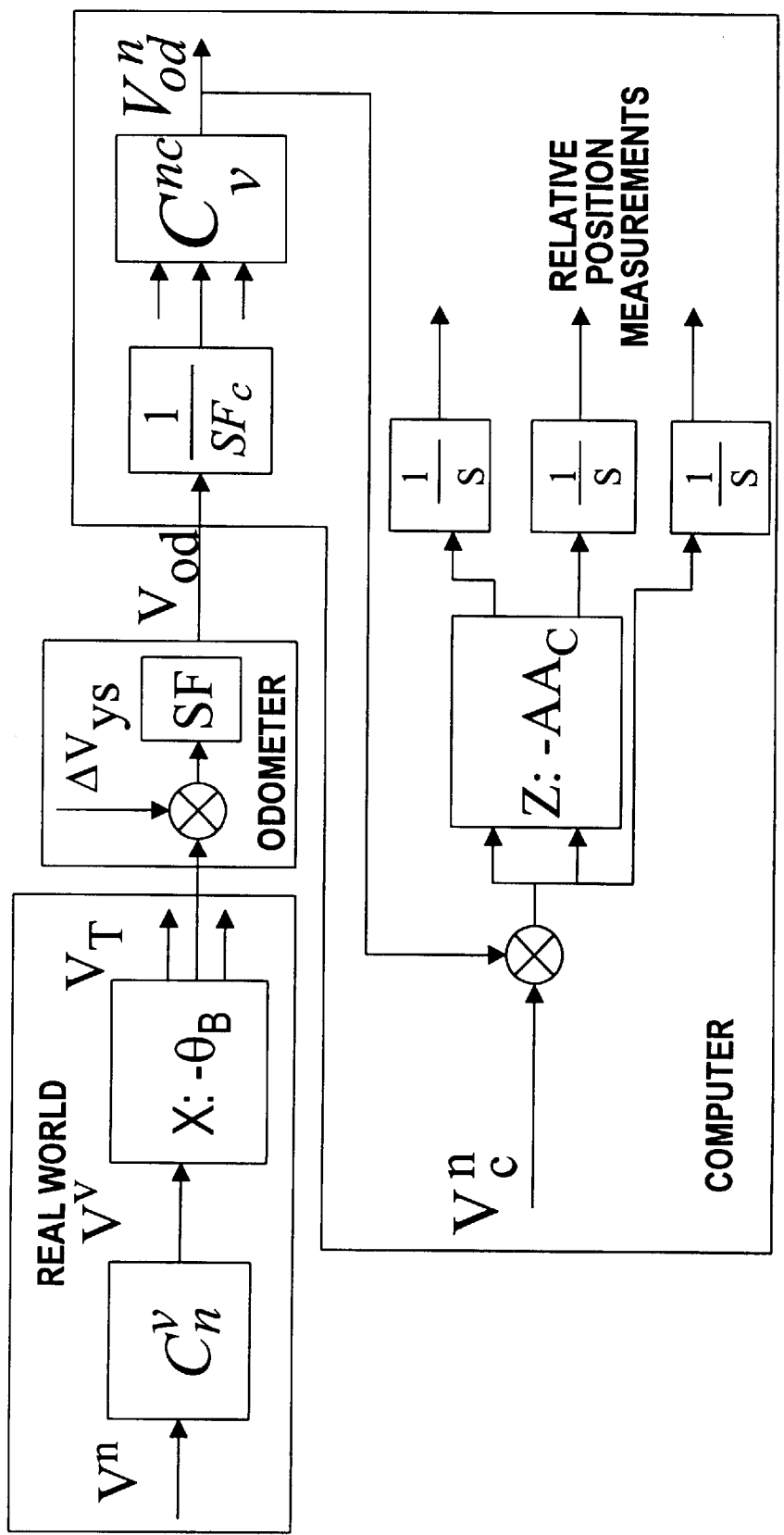
FIG. 13 is a block diagram illustrating odometer measurement model.

The odometer is the key sensor for land navigation. When the vehicle is moving on land, the odometer can measure the speed of the vehicle relative to the ground. When the vehicle is stopped, the odometer output is used for vehicle stop tests that are used to start the zero-updating processing. During land navigation, the odometer measured speed and INS produced speed are compared to obtain the velocity error measurements that are then used by the integration Kalman filter to estimate the system errors. In a practical system, the odometer measured speed is the vehicle true velocity in vehicle frame. To compare it with the navigation system produced velocity, it must be resolved in the navigation frame. FIG. 13 is the block diagram of the odometer measurement model.

The following is a brief description of the symbols used in FIG. 13:

$V^n$ true velocity in true navigation frame.

$V_c^n$ computed velocity in computed navigation frame.

$C_n^v$ transformation matrix from true navigation frame to vehicle frame.

$\theta_B$ terrain to vehicle frame rotation.

$V^v$ true velocity in vehicle frame.

$V^T$ true velocity in terrain frame.

$\Delta V_{ys}$ along terrain slip.

SF odometer scale factor.

$SF_c$ computer odometer scale factor.

$C_v^{nc}$ computed transformation matrix from vehicle to navigation frame.

$V_{od}$ indicated odometer output speed.

Figure 7:
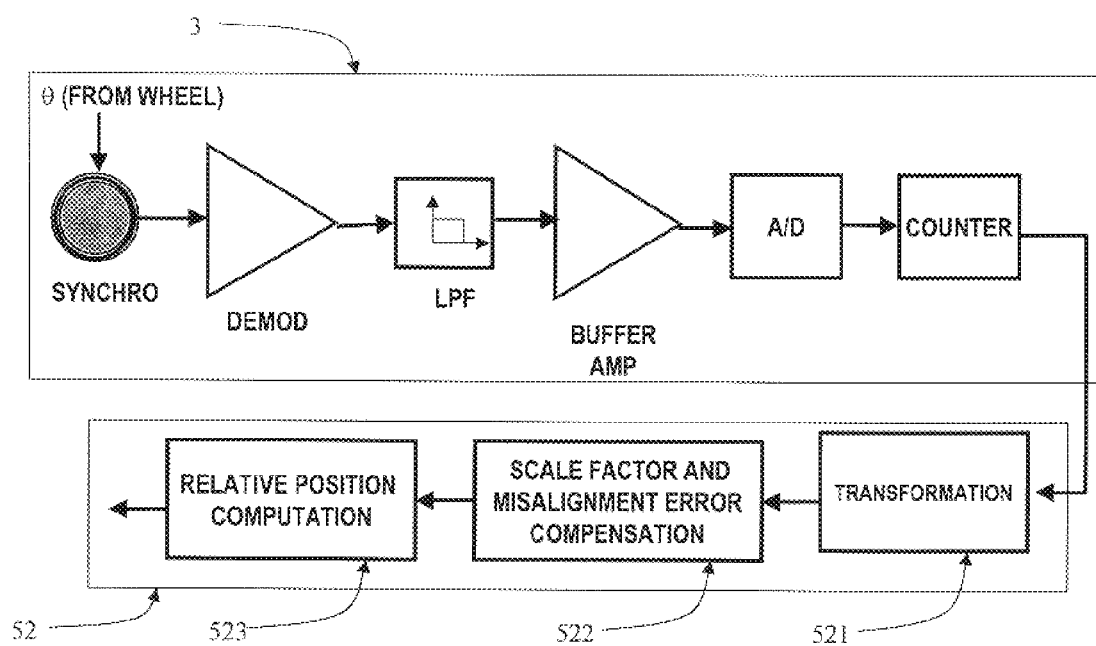
FIG. 7 is a block diagram illustrating odometer sensor signal processing.

FIG. 7 is a block diagram depicting the signal processing for the odometer. The odometer measures the rotation of the wheel of the vehicle with a synchro. The output of the synchro is a modulated signal of alternating current/voltage. This signal is demodulated and passed through a low pass filter to get an analog signal representing the delta distance in a sampling period. The signal is further converted to a digital signal for the navigation computer. It is noted that the measured delta distance is represented in the vehicle body frame instead of the navigation frame. Thus the delta distance must be transformed into the navigation frame representation. The slide of the vehicle wheel will cause measurement errors. In order to compensate the slide induced errors, the signal processing also includes the velocity change test and relative position change test procedure. Then, after the compensation for the scale factor and misalignment errors, the microprocessor for the odometer sensor can output position and velocity.

Figure 8:
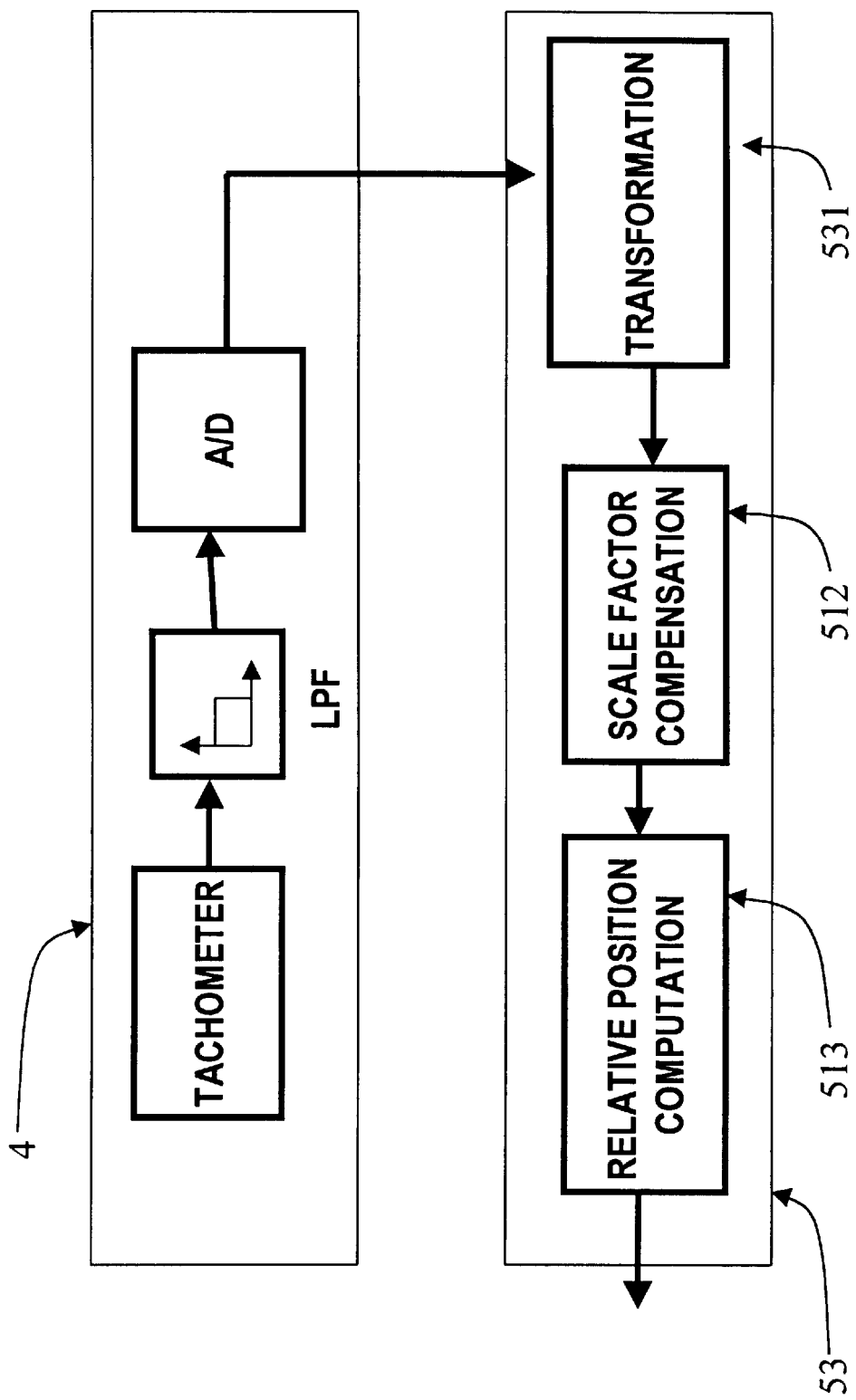
FIG. 8 is a block diagram illustrating velocimeter sensor signal processing.

FIG. 8 depicts the processing for the tachometer signal. The output of the tachometer is an analog signal. A low pass filter is used to suppress the noise and acts as an anti-aliasing filter. An A/D converter is used to convert the tachometer signal from analog to digital signal and input it into the processing computer. The digital tachometer signal is then integrated to get the delta distance or distance incremental. Because the delta distance is measure in the vehicle body frame, it must be changed into navigation frame to integrate it into position. Scale factor compensation is also carried out in the processing computer. In order to eliminate the bias error of the tachometer, the zero velocity test can be executed automatically or manually to obtain the calibration data for the tachometer.

In order to establish the INS error mode, we define the relationship between the reference/ideal system determined p platform and the actual/practical system determined platform pc as $$C_b^{pc} = C_p^{pc} C_b^p = (I + [\phi]) C_b^p$$

where I is the identity matrix and $[\phi]$ is the skew symmetric matrix form of vector $\phi$ $$[\phi] = \begin{bmatrix} 0 & \phi_z & -\phi_y \\ -\phi_z & 0 & \phi_z \\ \phi_y & -\phi_x & 0 \end{bmatrix}$$

Vector $\phi$ consists of three small angle error between the reference/ideal system determined p platform and the actual/practical system determined platform pc:

$$\phi = \begin{bmatrix} \phi_x \\ \phi_y \\ \phi_z \end{bmatrix}$$

The gyro and accelerometer models are expressed as $$\omega_{ibc}^b = \omega_{ib}^b + \epsilon^b$$

$$f_c^b = f^b + \nabla^b$$

where $\epsilon^b$ and $\nabla^b$ are generalized gyro and accelerometer errors. Superscript b means the errors are expressed in the body or sensor frame and are real sensor errors.

Then, the generalized linear INS error model, with first order approximation, can be expressed as following equations:

$$\Delta \dot{X} = \frac{\partial F_x(X)}{\partial X} \Delta X + \begin{bmatrix} [\phi]f^p + \nabla^p \\ O \end{bmatrix} + \begin{bmatrix} \Delta G^p \\ O \end{bmatrix}$$

$$\dot{\phi} = -\varepsilon^p - [\phi]\omega_{ip}^p + \Delta \omega_{ip}^p$$

$$= -\varepsilon^p - [\phi]\omega_{ip}^p + \frac{\partial F_\omega(X)}{\partial X} \Delta X$$

or in vector form $$\dot{\phi} = \phi \times \omega_{ip}^p + \Delta \omega_{ip}^p - \epsilon^p$$

where $$f^p = C_b^p f^b$$

$$\nabla^p = C_b^p \nabla^b$$

$$\epsilon^p = C_b^p \epsilon^b$$

This generalized INS error model can be used to derive specific error models for different system configurations.

Based on the INS error model and the odometer error model, we can obtain a combined land-navigation error model for Kalman filter construction.

Figure 15:
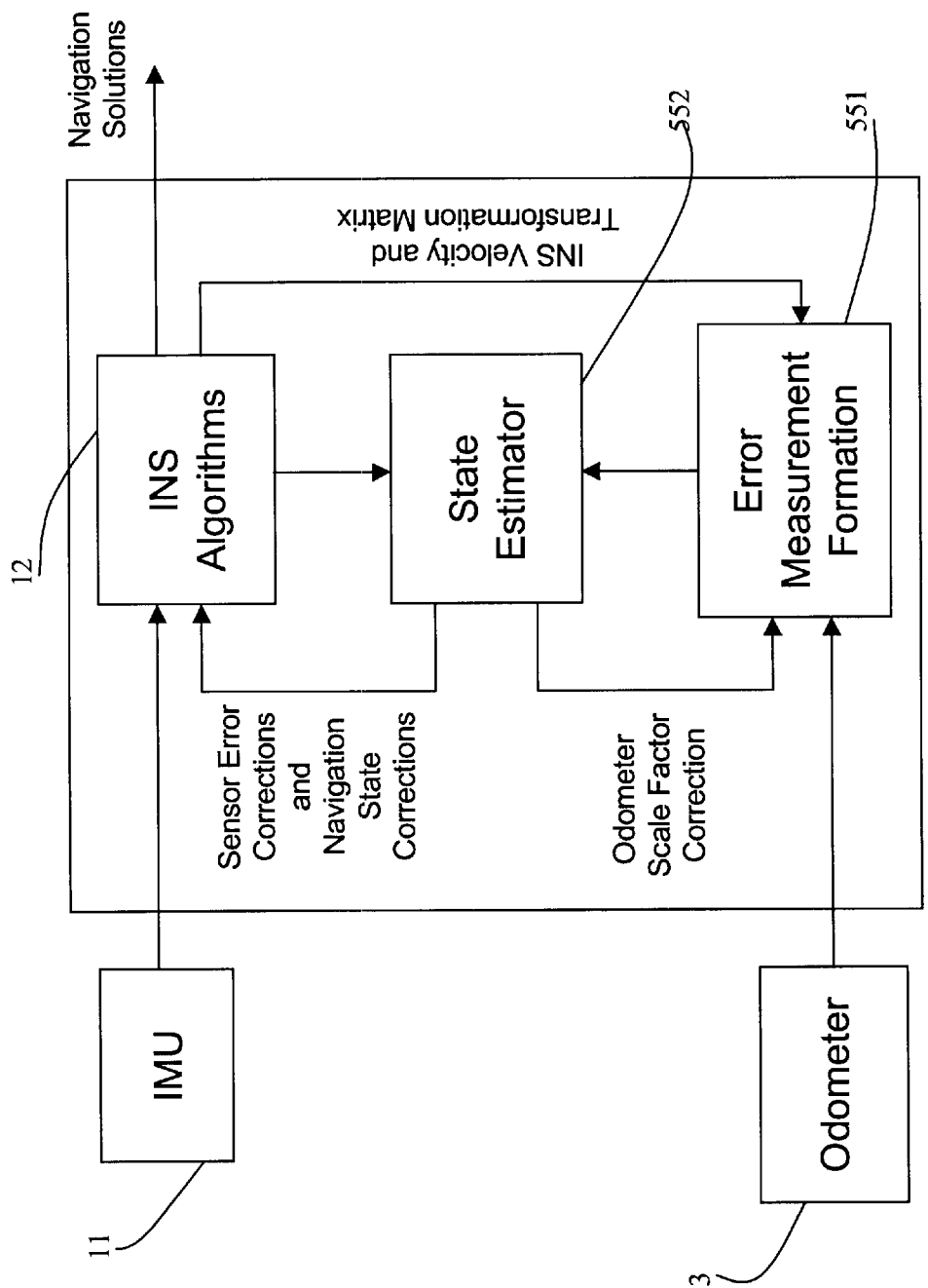
FIG. 15 is a block diagram illustrating land navigator system model.
Figure 17:
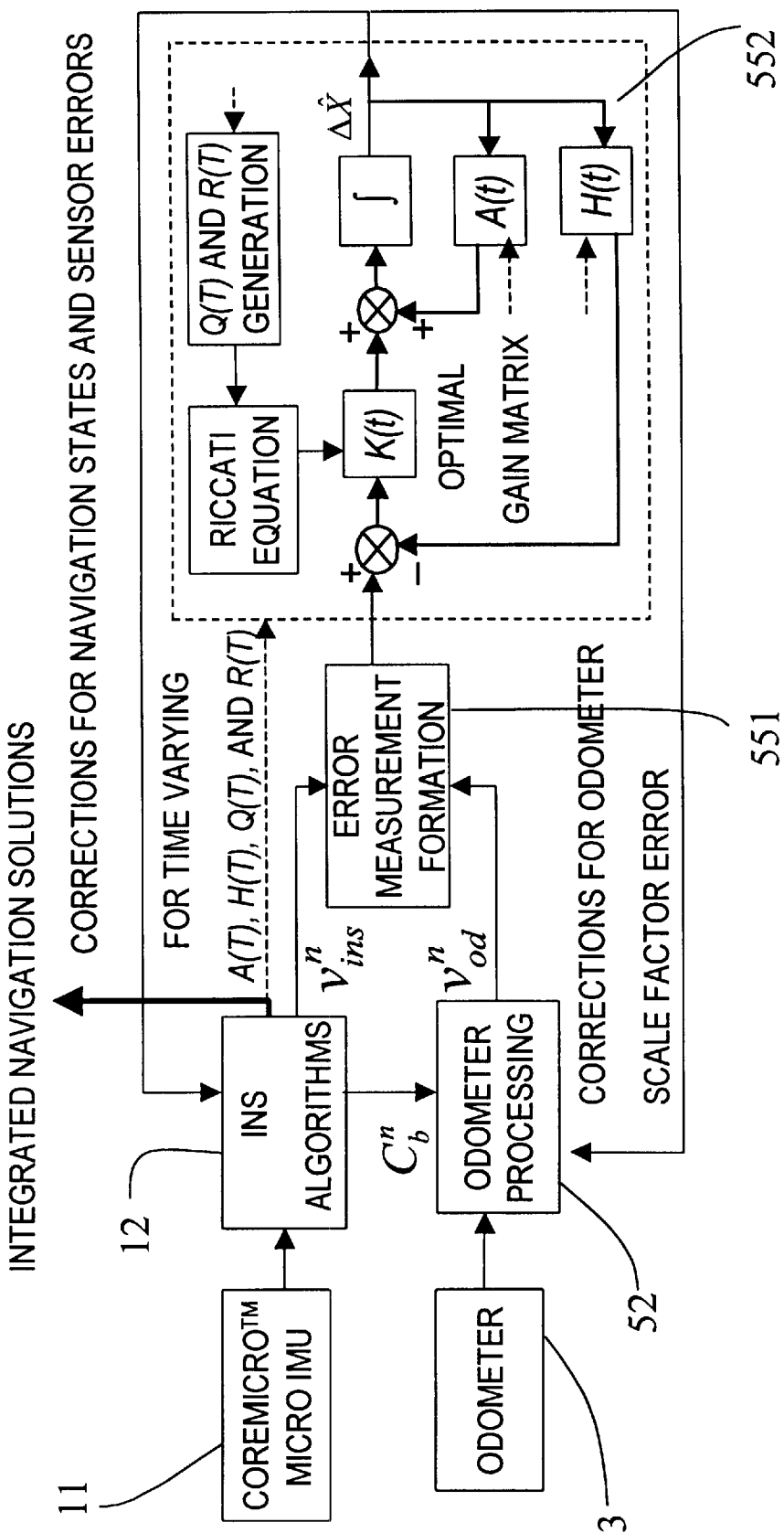
FIG. 17 is a block diagram illustrating integrated system configuration.

Referring to FIGS. 1, 15, and 17, the integration Kalman filter 55 further comprises an error measurement formation module 551 for forming measurements for a state estimator, and a state estimator 552 for computing the estimates of the inertial solution data errors.

In the preferred embodiment of the state estimator 552, the state estimator 552 further comprises a horizontal filter, for obtaining estimates of horizontal INS solution data errors and a vertical filter for obtaining estimates of vertical INS solution data errors.

The preferred state vector $\Delta X$ of the horizontal filter consists of following variables:

1. $\theta_x$ position error about x (rad)
2. $\theta_y$ position error about y (rad)
3. $\Delta v_x$ x velocity error (F/s)
4. $\Delta v_y$ y velocity error (F/s)
5. $\phi_x$ x tilt error (rad)
6. $\phi_y$ y tilt error (rad)
7. $\theta_z$ azimuth error (rad)
8. $\Delta x_R$ relative position error about x (FT)
9. $\Delta y_R$ relative position error about y (FT)
10. $\epsilon_x$ x gyro bias error (R/s)
11. $\epsilon_y$ y gyro bias error (R/s)
12. $\epsilon_z$ z gyro bias error (R/s)
13. $\Delta\theta$ odometer/velocimeter horizontal boresight (rad)
14. $\Delta SF$ odometer/velocimeter scale factor error The preferred state vector $\Delta X$ of the vertical filter consists of following variables:

1. $\Delta EL$ = elevation error (FT)
2. $\Delta v_z$ = z velocity error (F/s)
3. $\Delta z_R$ = z relative position error (FT)
4. $\epsilon_{AZB}$ = z accelerometer bias (F/s$^2$)
5. $\Delta\theta_v$ = odometer vertical boresight (rad)

For land navigation, the Kalman filter from time to time receives external information:

1. Position change known—Odometer.
2. Position change to be zero—zero velocity update.
3. Absolute position known—position update.
4. Absolute elevation known—elevation update.

The difference between the system value and the true value of the above four parameters—the observed errors—may be used to estimate and correct 19 major error sources in the system. The purpose of the Kalman filter is to compute optimum gains to produce corrections to the 19 error sources (states) given the observed error.

The difference between odometer velocity and navigation system velocity, both resolved into a "level body" coordinate, is rapidly integrated into 3 components of relative position. Every 8 seconds (the Kalman update interval), the x and y relative positions are provided to the level Kalman filter and the z relative position is provided to the vertical Kalman filter. The filters will then proceed with the update and will eventually correct the system.

The Kalman software is organized into three tasks, i.e.

(a) Initialization, (b) propagation, and (c) update.

In addition, the fast navigation/odometer task must form and save the measurements for the Kalman and must apply the final Kalman corrections at the proper time.

Kalman Initialize Task

The purpose of the task is to provide initial covariances, dynamic matrix elements and white noise magnitudes representing the statistics of errors expected to exist at the end of standard INS two position alignments. The Kalman proposed herein is not used for alignment. This task is called on demand at end of align.

Kalman Propagate Task

This routine propagates the covariances every the predetermined period, for example. every 2 seconds. 14 states are propagated in the horizontal filter and 5 in the vertical according to the basic matrix equation:

$$P = P + \phi P + (\phi P)^T + (\phi P \phi)^T + Q\Delta T$$

Where

P = covariance matrix

Q=white noise matrix
φ=approximate transition matrix minus identity matrix
ΔT=propagation time interval
A=system dynamics matrix

Kalman Update Task

The Kalman update task will provide updates to the system and will update the covarinaces every predetermined interval, for example, 8 seconds. The Kalman update task performs the matrix math required to solve for the Kalman gains and the new covariances reflecting the states following the correction:

$$K=PH^T(HPH^T+R)^{-1}$$

Where
P=covariance matrix
H=observation matrix
R=measurement noise matrix
K=gain matrix The Kalman update task also computes corrections to the system $$X=KM$$

Where
K=gain matrix computed above,
M=measurement (observed error), and
X=estimates of errors in the system to be corrected.

The vector X is saved for the fast navigation/odometer task to correct the system at the required time.

Horizontal filter observation matrix and observation noise. The horizontal filter accepts updates using 3 of the 4 types of external inputs.
1. Odometer
2. Zero velocity
3. Position When odometer or zero velocity updates are performed, both x and y relative position measurements are used. The horizontal Kalman will sequentially perform two updates one on each coordinate.

The lower value when stopped corresponds to vehicle jitter due to wing buffeting, personnel movement, etc.

The H matrix is identical for odometer or zero velocity. The only distinction between these two is the change in noise when the stop flag is set.

For zero velocity updates, see above parameters.

When absolute position is performed, it will be required that both coordinates of horizontal position are known. The Kalman will sequentially perform two updates, one on each coordinate.

The Kalman update task computes estimates of system errors as described bellow. The actual application of the errors (correction to the system) is done by the fast navigation loop at a specific moment.

The estimate x of system errors following a Kalman measurement M is given by $$X=KM$$

Where K is the gain vector.

In the case of the horizontal Kalman, there are two measurements, x axis and y axis taken at each 8 sec index. The two measurements are processed sequentially and thus each produces its own estimate vector X, the total estimate is the sum and is more conveniently implemented by using the following twice:

$$X=X+KM$$

Where X is cleared initially and where KM applies to the X axis measurement and then to the y axis measurement.

The vertical Kalman has only 1 measurement (z axis) at each 8 sec index but this fits the more general approach above provide X is initially cleared.

Before allowing the computed errors X to be applied as corrections to the system we must adjust the errors for any change in the error that may be expected to have occurred in the interval between the time the measurements were taken and the time the corrections are finally applied to the system. The approach is to pick a fixed safe interval, 2 sec, which will provide ample time for the necessary computations, and adjust the errors by how much they would change in 2 sec.

The change in the error is approximately $$\Delta X=\phi X\Delta T,$$

thus the total error to be applied as a correction to the system 2 sec after the measurement is $$X+\phi X\Delta T.$$

The zero velocity update module 54 comprises a motion test module and a zero velocity measurement generation module.

The motion test module further comprises the following modules to determine if the vehicle stops:
- an odometer change test module, for receiving the odometer reading to determining if the vehicle stops or restarts;
- a system velocity change test module, for comparing system velocity change between the current interval and the previous interval to determining if the vehicle stops or restarts;
- a system velocity test module, for comparing the system velocity magnitude with a predetermined value to determine if the vehicle stops or restarts; and
- an attitude change test module, for comparing the system attitude magnitude with a predetermined value to determine if the vehicle stops or restarts.

For example, the Kalman update interval is 8 sec. The motion during the 8 sec period is analyzed to determine if the vehicle "stopped" for the entire 8 sec. If so, the "stop" flag is set. To do the update with small measurement noise the vehicle must have been "stopped" for the proceeding 8 sec. Once stop has been set, it may be reset as soon as motion is detected, which may be in less than 8 sec. If stop is reset, it may only be set by 8 continuous seconds of no motion.

At the start of the candidate 8 sec interval, the odometer input pulses are summed as they are read in. If the absolute value of the accumulation ever exceeds 2 pulses at any time in the 8 sec interval, stop is reset.

If the vehicle is actually stopped, we would expect indicated system velocity to be small. However, we can not distinguish between system velocity error and small actual vehicle velocity. A more robust test is to test velocity change. If the vehicle is actually moving, we would not expect velocity to remain constant. However, if the vehicle is stopped, the system would change very slowly due to scheulering.

For example, every 2 seconds, the average x, y, z velocities (as determined by x, y, z position change in 2 seconds) are compared to the previous 2-second average x, y, z velocities, respectively. If any 2-sec change in any axis exceeds 0.1 F/s, the entire 8-sec interval is defined "not stopped". Note that a velocity of 0.1 f/s for 2 sec correspond to 0.2 ft (or approximate 2 inch) of vehicle disturbance which will be allowed.

If we assume an upper bound of 10 f/s for the magnitude of system velocity error, we use this criteria:

Every 2 seconds, compare the average x, y, z velocities with 10 f/s. reset stop if any velocity is greater in magnitude than 10 f/s.

In a tracked vehicle with only one odometer and with the IMU mounted near the odometer, the vehicle may turn by locking this track, giving no odometer output and small IMU velocities. This situation is detected by attitude change.

The total attitude change in any 2 second interval and in any 8 sec interval must be less than 1 degree to set stop.

Every 8 sec the x, y, z relative position measurement is passed to the Kalman filter to perform an update. The scalor $D=[H][P][H^T]+R$ is an estimate of the covariance of this measurement and may be used to test the reasonability of the magnitude of the measurement. Three such scalors are available, one for each axis. The sigma for each axis is $\sqrt{D}$ for that axis.

For each axis, if the absolute value of the measurement is greater than $2\sigma$, extra slippage noise is added for that 8 sec interval to increase the covariance of relative position such that the new $\sigma^2$=measurement squared. This will reduce the computed gains to all states except relative position so the measurement has little effect except to reset the relative position states.

If several consecutive measurements constantly remain higher than $2\sigma$ and of the same sign, this is an indication of some steady error rather than random slippage, and the Kalman should be allowed to attempt to correct its sources. The probable cause is a large odometer scale factor change due to terrain change, or in the case of the other 2 axes, a change in vehicle loading. However, if these $2\sigma$ errors have been rejected (B above) for some time, interval velocity errors may also have had time to grow. It is thus dangerous to try to increase the covariance of the odometer states since they would then follow what may now be large inertial errors. A safer approach is to simply allow the error to be passed to the Kalman without reducing the gain as was done in B above. The large error will begin to "safely" estimate new odometer states.

The criteria for when to reject $2\sigma$ errors by increasing slip noise, and when to accept $2\sigma$ errors by not increasing slip noise is as follows:

For each axis, the measurement is divided by the unadjusted $\sigma$ to get an error in units of "sigmas". This scaled error is filtered with a time constant of 80 secs (ten 8-second). If the difference between the raw and filtered value exceeds $2\sigma$, the measurement is rejected (using approach in B). Notice that if the error remains for some time, the filtered value will approach the error, allowing the error to be accepted.

Figure 14:
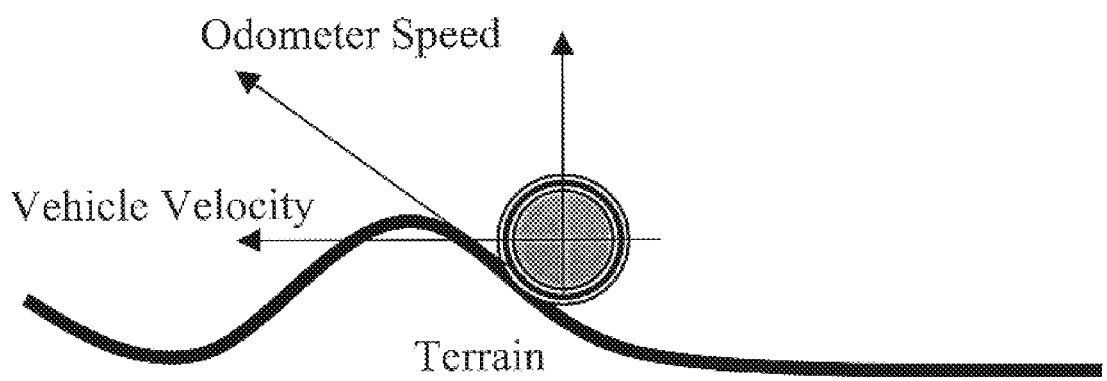
FIG. 14 shows relationship between vehicle and terrain frames.

In the simulation model, as shown in FIG. 13, a trajectory simulator will be used to produce true velocity in true navigation frame. This velocity is then transformed into the vehicle frame. The odometer does not measure vehicle velocity in the vehicle frame, but in the so called terrain frame. FIG. 14 depicts the relationship between this two frames. The terrain induced error is related to terrain angle $\theta_B$. In the simulation $\theta_B$ can be represented by a random value or a sine function depending on the terrain roughness.

The true velocity component along the Y axis of the terrain frame is the input of the odometer model. The odometer model consists of one parameter, scale factor, and a slip model to represent the vehicle wheel slippage on the road. In the simulation, the slip variable is simulated by a stochastic process with its covariance determined by the dynamics of the vehicle motion. The output of the odometer is then sent to the computer to form the error measurements for integration by the navigation filter.

The zero velocity updating is also included in the Kalman filter. FIG. 15 depicts the land navigation system model. Theoretically, the INS algorithms in the computer can obtain all the navigation states including position, velocity, attitude and heading of the vehicle. In a practical system, however, the INS solutions contain errors that increase with time because of INS system characteristics and IMU sensor errors. To prevent or reduce growth of the errors, external information is required. Thus, in land navigation an odometer is used to obtain motion measurements. When the vehicle is moving, the odometer measurement is used to form velocity error or relative position measurements. The odometer output is also used to check if the vehicle is stopped. The stop information is used to start the zero velocity updating processing in the Kalman filter.

The land navigation computation consists of three parts: INS algorithms, error measurement formation and integration Kalman filtering. The odometer measured vehicle speed is first transformed from the vehicle frame to the navigation frame. In the navigation frame, the odometer measured velocity and INS computer velocity are compared to produce a velocity error measurement. The Kalman filter uses the error measurements to estimate the navigation solution errors. The principle behind the Kalman filter is that the error measurements are induced by the navigation state errors and sensor errors. Thus, they contain the information of the state errors and sensor errors. If we know the relationship between the error measurements and the state errors and sensor errors, a Kalman filter can be constructed to estimate the navigation state errors and sensor errors. The relationship is usually represented by the dynamic error models of the INS and odometer. Therefore the error models of the INS and odometer are essential to the design of the Kalman filter.

The Kalman filter estimation accuracy depends on the structure of the filter, noise of the system and measurement, and the observability of the error model, which is related to the vehicle maneuvers. The Kalman filter estimates are then fed back to the INS and odometer data processing algorithms to correct the INS state errors, IMU sensor errors and odometer scale factor error. The integration of INS and odometer can greatly enhance the land navigator performance. The evaluation of the integrated system can be performed by various simulation approaches.

A generic system dynamic model is established. We have obtained a specific linear time varying dynamic model for an integration Kalman filter design.

In the INS error model, we choose the directions of the Navigation (N) frame axes as East, North, and Zenith (ENZ). The velocity of the vehicle with respect to the earth is resolved in the N frame and the wander azimuth angle $\alpha$ is set to zero. To express the INS model in a compact form, we introduce a vector defined as:

$$X = \begin{bmatrix} V \\ \varphi \\ \lambda \end{bmatrix} = \begin{bmatrix} v_x \\ v_y \\ \varphi \\ \lambda \end{bmatrix}$$

For land and sea navigation, the vertical channel is considered to be accurate enough to assume $\Delta v_z=0$. We define the relationship between the reference/ideal system determined platform n and the actual/practical system determined platform nc as a vector $\phi$.

Vector $\phi$ consists of three small angle errors between the reference/ideal system determined platform n and the actual/ practical system determined platform nc:

$$\phi = \begin{bmatrix} \phi_x \\ \phi_y \\ \phi_z \end{bmatrix}$$

$[\phi]$ is the skew symmetric matrix form of vector $\phi$ $$[\phi] = \begin{bmatrix} 0 & \phi_z & -\phi_y \\ -\phi_z & 0 & \phi_x \\ \phi_y & -\phi_x & 0 \end{bmatrix}$$

The gyro and accelerometer models are expressed as $$\omega_{ibc}{}^b = \omega_{ib}{}^b + \epsilon^b$$

$$f_c{}^b = f^b + \nabla^b$$

where $\epsilon^b$ and $\nabla^b$ are the generalized gyro and accelerometer errors and the generic gyro drifts and generic accelerometer biases, respectively. Superscript b means the errors are expressed in the body or sensor frame and are real sensor errors.

The generalized linear INS error model, with a first order approximation, can be expressed in the following equations:

$$\Delta X^1 = \frac{\partial F_x(X)}{\partial X} \Delta X + \begin{bmatrix} [\phi] f^n + \nabla^n \\ O \end{bmatrix} + \begin{bmatrix} \Delta G^n \\ O \end{bmatrix}$$

$$\phi^1 = -\epsilon^n - [\phi]\omega_{in}^n + \Delta\omega_{in}^n$$

$$= -\epsilon^n - [\phi]\omega_{in}^n + \frac{\partial F_\omega(X)}{\partial X} \Delta X$$

or in vector form $$\phi^1 = \phi \times \omega_{in}{}^n + \Delta\omega_{in}{}^n - \epsilon^n$$

where $$f^n = C_b{}^n f^b$$

$$\nabla^n = C_b{}^n \nabla^b$$

$$\epsilon^n = C_b{}^n \epsilon^b$$

In the defined N frame, the earth rate and gravity are expressed in components as:

$$\Omega_{ie}^n = \begin{bmatrix} 0 \\ \Omega\cos\varphi \\ \Omega\sin\varphi \end{bmatrix}$$

$$G^n = \begin{bmatrix} 0 \\ 0 \\ g \end{bmatrix}$$

In the integrated navigation system, the real accelerometer biases and gyro drifts, $\nabla^b$ and $\epsilon^b$, are to be estimated. Thus the $\nabla^b$ and $\epsilon^b$ must be included in the error model as 3 accelerometer bias variables and 3 gyro drift variables, respectively.

The accelerometer biases and gyro drifts can be represented by a set of independent stochastic processes. In practice, a gyro drift or an accelerometer bias is modeled by the output of a first order formulation filter driven by a white noise.

The augmented state vector of the INS error model can be defined as:

$$\Delta\bar{X} = [\Delta v_x, \Delta v_y, \Delta\phi, \Delta\lambda, \phi_x, \phi_y, \phi_z, \epsilon_x, \epsilon_y, \epsilon_z, \nabla_x, \nabla_y, \nabla_z]^T$$

Then the augmented INS error model is represented in a compact format as the following:

$$\Delta\bar{X}^1 = A(t)\Delta\bar{X} + W(t)$$

where $A(t)$ is the model's dynamic matrix, $W(t)$ is the white noise inputs to the model determined by the stochastic models of both the gyro and the accelerometer. It is noted that, $A(t)$ is a constant matrix when the vehicle is stationary and a time varying matrix when the vehicle is in motion. It is determined by the navigation state vector of the system as depicted by the following equation:

$$A(t) = A(v^n, C_b{}^n, \phi, \lambda, f^n)$$

where $f^n$ is the specific force expressed in the N frame or outputs of the accelerometers resolved in the N frame. In a practical system, the ideal navigation state vector is unknown and, thus, the computed navigation state vector is used in the Kalman filter computation instead.

In the integrated navigator, the odometer measured velocity and INS velocity are compared to form the velocity error measurements for the integration Kalman filter for estimation of the system errors. In a practical system, the odometer measures the vehicle true velocity in the vehicle (V) frame. To compare it with the INS velocity, it must be resolved into the navigation frame.

The odometer measured velocity of the vehicle can be considered as the vehicle absolute velocity with respect to the earth resolved along the Y axis of the vehicle frame:

$$v^v = \begin{bmatrix} 0 \\ v_y^v \\ 0 \end{bmatrix}$$

This velocity vector can be transformed to the B frame:

$$v^b = C_v{}^b v^v$$

where $C_v{}^b$ is the transformation matrix from the V frame to the B frame. In a practical system, $C_v{}^b$ is a constant matrix determined by the instantaneous angle of the IMU with respect to the vehicle frame. Then the velocity $v^b$ is transformed into the navigation (N) frame:

$$v^n = C_b{}^n v^b$$

But in a practical system, when the ideal matrix $C_b{}^n$ is unknown, we can use the INS computed $C_b{}^n$, noted as $C_b{}^{nc}$. The odometer indicated velocity also contains errors: usually scale factor error, slippage error, and boresight and terrain induced errors. The odometer velocity expressed in the N frame can be written as:

$$v_{od}{}^n = C_b{}^{nc} C_v{}^b v_{od}{}^v$$

The above equation indicates that, in the integrated navigation system, the velocity obtained from the odometer is not only affected by the errors from the odometer itself, but also by the attitude error of the system, because we have to resolve and compare the two velocities in the same frame.

Comparing the vehicle velocities from the INS and from the odometer measurement, we can form the velocity error measurement as follows:

$$Y = v_{ins}{}^n - v_{od}{}^n = \Delta v^n - \Delta SF v^n - [\phi] v^n - v_{slip}{}^n$$

For the land navigator, this is the measurement equation for the Kalman filter. Usually, the scale factor error is considered as a constant. If we want to estimate the scale factor error in the Kalman filter, we can include it in the state vector of the error model. The state vector of the integrated system model can be represented as:

$$\Delta \overline{X} = [\Delta v_x \Delta v_y \Delta \phi \Delta \lambda \phi_x \phi_y \phi_z \epsilon_x \epsilon_y \epsilon_z \nabla_x \nabla_y \nabla_z \Delta SF]^T$$

and $$\Delta \theta^B = 0$$

Then, the measurement equation can be written as:

$$Y = v_{ins}{}^n - v_{od}{}^n = H(t) \Delta \overline{X} + V(t)$$

where H(t) is called the measurement matrix. It is determined by the velocity of the navigation system:

$$H(t) = H(v^n)$$

And, V(t) is the stochastic process determined by the odometer measurement errors such as slippage, boresight, and terrain induced errors.

Figure 16:
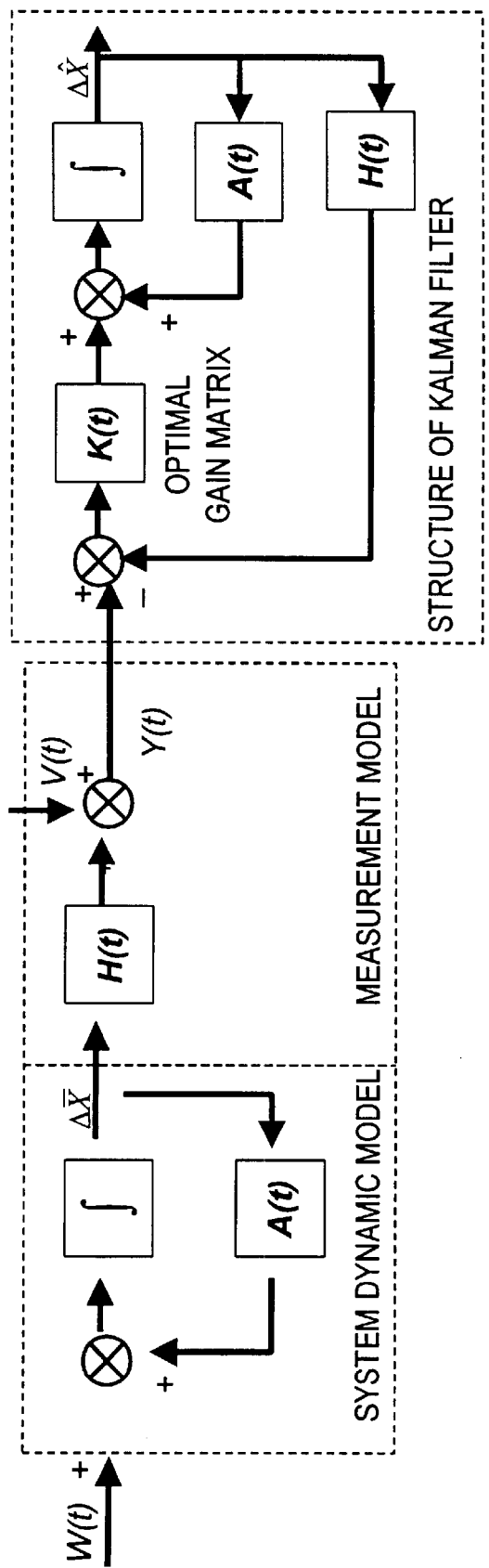
FIG. 16 is a block diagram illustrating system model and Kalman filter configuration.

The principle and configuration of the Kalman filter is depicted in FIG. 16. The error measurements Y(t) are induced by the navigation state errors and the sensor errors $\Delta \overline{X}$. The Kalman filter uses the error measurements Y(t) to estimate the navigation state errors and the sensor errors $\Delta \overline{X}$.

Y(t) contains the state error and sensor error information. The relationships between the error measurements and the state errors and sensor errors are described by the system dynamic model and the measurement model. Based on the system models, a Kalman filter can be constructed to estimate the navigation state errors and sensor errors by using the measured Y(t) and the known system parameters A(t) and H(t) and system noise characteristics. Here, the system model is represented by the dynamic error models of the INS and odometer.

The Kalman filter estimation accuracy $\|\Delta \hat{X} - \Delta \overline{X}\|$ is determined by the structure of the filter, the noise of the system and measurement, and the observability of the system model, which is related to the vehicle maneuvers. The Kalman filter estimates, $\Delta \hat{X}$, are then fed back to the INS and odometer data processing algorithms to correct the INS state errors, IMU sensor errors, and odometer scale factor error. The INS and odometer corrections greatly enhance the land navigator's performance.

With the Kalman filter and feedback correction, the configuration of the integrated navigation system is depicted in FIG. 17. This system is a time continuous system to show the system structure. In a practical system realization, the system model and Kalman filter are transformed to discrete systems which are suitable for computer implementation.

In the integrated navigation system, the Kalman filter requires, not only the error measurements, but also the navigation state vector for the filtering computation. This is because the system error model is a time varying system, if the vehicle is in motion. The Kalman filter requires the navigation states in order to update the time varying parameters of the system error model, such as A(t) and H(t). For the vehicle motion, Q(t) and R(t) also vary according to the motion conditions. From actual van tests, we can obtain an empirical method and algorithm to change Q(t) and R(t) to achieve optimal integration performance.

In the low cost navigator based on MEMS, magnetic heading sensor device is used to aid the inertial heading measurement and to estimate the gyro bias or drift. We have investigated application of two types of magnetic heading sensor devices for the land and sea navigator, flux valve and magneto-inductive sensor.

The flux valve detects the magnitude and direction of the earth's magnetic field and converts it to electrical information which is used to obtain the magnetic north. A single remote compensator can be used to compensate the flux valve by inserting small DC currents to cancel the errors caused by vehicle magnetic disturbances.

Magneto-inductive magnetic sensors change inductance with different applied magnetic field strengths. This variable inductance property has been used to create very sensitive magnetic sensors that are low in cost and power. The magneto-Inductive magnetic sensors uses advanced electronics and correction algorithms to counter the effects of hard and soft iron, enabling it to maintain a high degree of accuracy even in the most demanding environments.

To obtain the true geographical heading, the magnetic heading is calibrated by using a table of the earth's magnetic field as a function of position. Together with the calibration processing, the magnetic measurement model can be represented by the following equation:

$$\theta_m = \theta + \Delta \theta_{m0} + \theta_n$$

where $\theta_m$ is the measured true heading, $\theta$ is the actual or ideal heading, $\Delta \theta_{m0}$ is the calibration/compensation error, and $\theta_n$ is the noise of magnetic measurement. In simulation and system analysis, the calibration error can be considered as a constant measurement error, and the noise of magnetic measurement and a stochastic process.

In order to use the magnetic heading to aid the INS, it must be compared with the inertial magnetic heading measurement. The inertial magnetic can be computed from $C_n^b$ in the INS attitude integration. Because of the gyro error and other error sources in the INS, the inertial heading measurement contain an error that will increase with the time:

$$\theta_{ins} = \theta + \Delta \theta$$

where $\theta_{ins}$ is the inertial heading measurement, $\theta$ is the ideal heading, and $\Delta \theta$ is the inertial heading error.

The inertial heading error is considered to be driven by a time varying gyro drift and a stochastic process. In the construction of the extended Kalman filter, the above error model is augmented as:

$$\Delta \dot{\theta}^B = \epsilon(t) + \epsilon_{random} = \epsilon(t) + w_1$$
$$\dot{\epsilon}(t) = w_2$$

Comparing the inertial and magnetic heading measurements, we arrive at an error measurement equation as $$Y = \theta_{ins} - \theta_m = \Delta \theta - \Delta \theta_{m0} - \theta_n$$

A Kalman filter is constructed to estimate the inertial heading error and the equivalent gyro drift and thus eliminate them in the navigation processing.

The preferred self-contained processing method of the present invention comprises the following steps:

(1) sensing vehicle motion and producing digital angular increments and velocity increments signals in response to vehicle motion by an inertial measurement unit;

(2) sensing earth's magnetic field to measure the heading angle of the vehicle by a magnetic sensor, (3) measuring the relative velocity of the user relative to the ground by an odometer, (4) measuring the relative velocity of the user relative to the water by a velocimeter, and (5) deducing position data in an integration processor, using the digital angular increments and velocity increments signals, heading angle, the relative velocity of the user relative to the ground, or the relative velocity of the user relative to the water.

The step (5) further comprises the following preferred modules:

(5.1) computing inertial positioning measurements using the digital angular increments and velocity increments signals;

(5.2) computing the heading angle using the earth's magnetic field measurements;

(5.3) creating a relative position error measurement in the odometer processing module using the relative velocity of the user relative to the ground to for a Kalman filter;

(5.4) creating a relative position error measurement in the velocimeter processing module using the relative velocity of the user relative to the water for a Kalman filter; and (5.5) estimating errors of inertial positioning measurements by means of performing Kalman filtering computation to calibrate the inertial positioning measurements.

The step (5.1) further comprises the steps of:

(5.1.1) integrating the angular increments into attitude data, referred to as attitude integration processing;

(5.1.2) transforming measured velocity increments into a suitable navigation coordinate frame by use of attitude data, wherein the transferred velocity increments are integrated into velocity data, denoted as velocity integration processing; and (5.1.3) Integrating the navigation frame velocity data into position data, denoted as position integration processing.

The step (5.5) further comprises the steps of:

(5.5.1) performing motion tests to determine if the vehicle stops to initiate the zero-velocity update, (5.5.2) formulating measurement equations and time varying matrix for the Kalman filter, and (5.5.3) computing estimates of the error states using Kalman filter.

Figure 10:
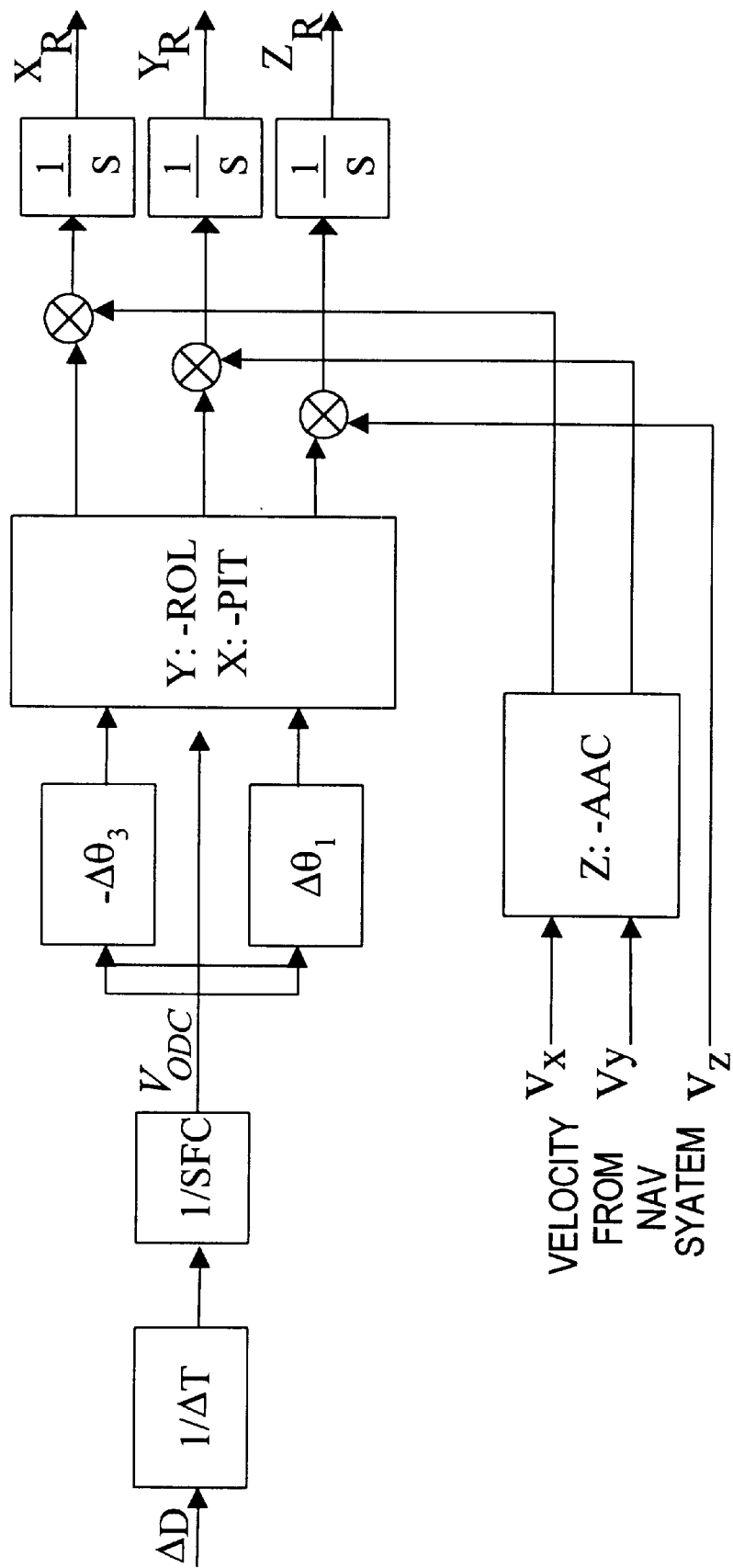
FIG. 10 is a block diagram illustrating position measurement formation.
Figure 11:
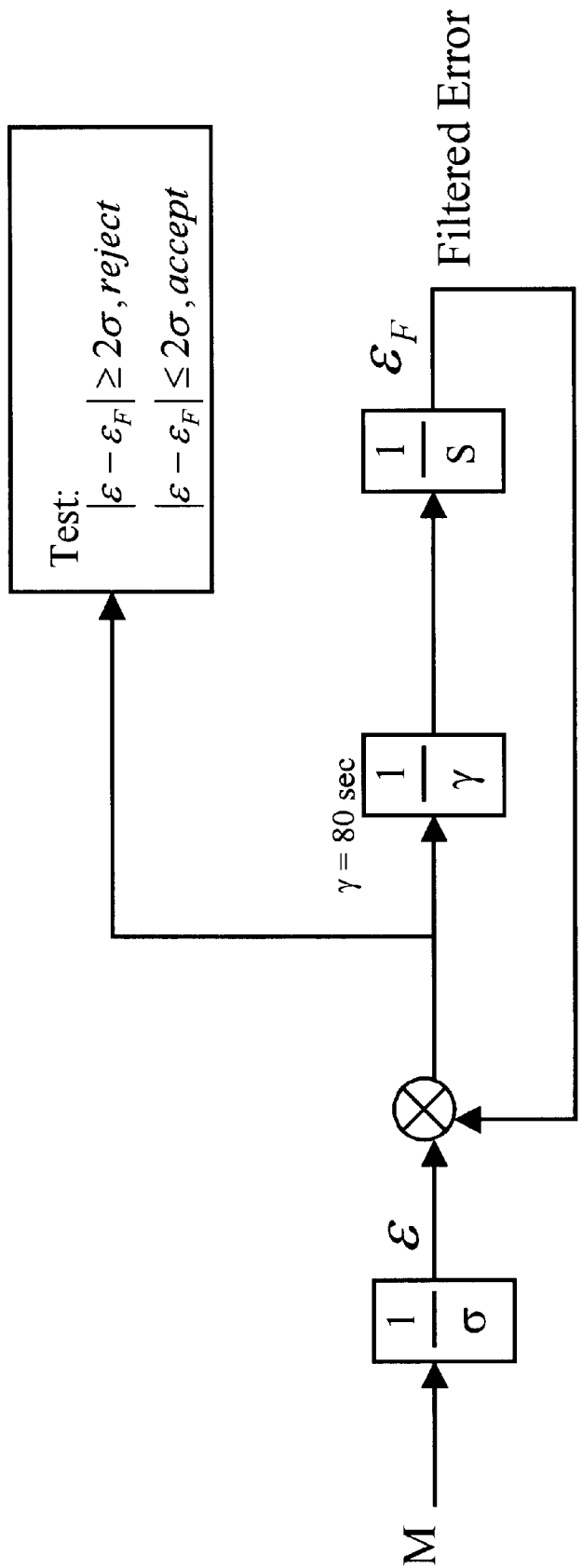
FIG. 11 is a block diagram illustrating $2\sigma$ relative position test.
Figure 12:
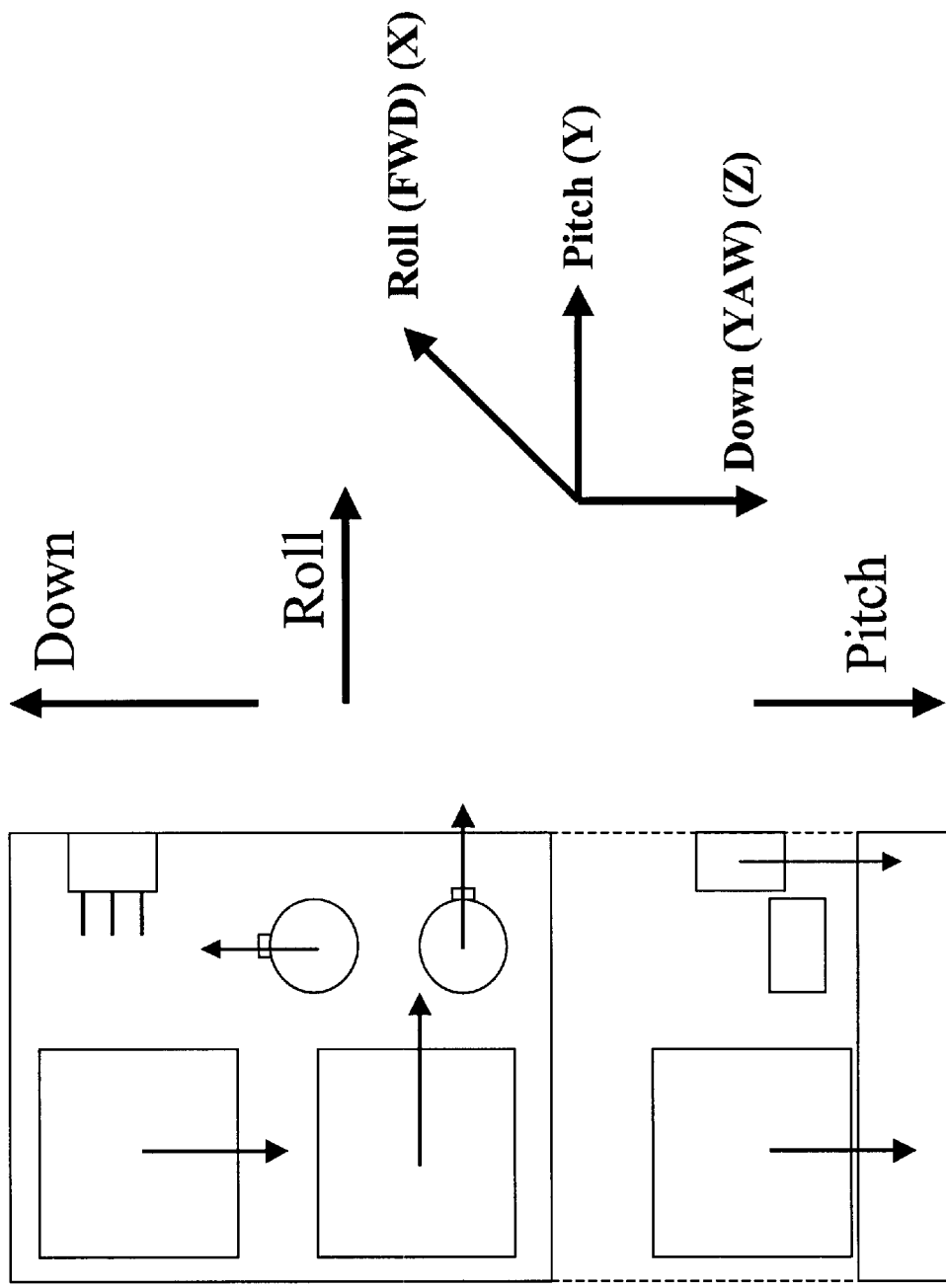
FIG. 12 shows miniature IMU and its axis definition.

A flow diagram of the preferred implementation in step (5.3) to form the measurement is given in FIG. 10.

The variables and parameters in FIG. 10 are defined and described as follows:

$\Delta D$, odometer position change pulses.

$\Delta T$, time interval of high speed navigation/odometer loop.

$\Delta D/\Delta T$, velocity indicated by the odometer.

SFC, scale factor in pulse/(F/s).

$V_{ODC}$, computed odometer velocity.

$\Delta \theta_1$ and $\Delta \theta_3$, horizontal and vertical odometer boresight estimates.

PIT and ROL, IMU pitch, roll. Odometer mechanism assumes no turn.

$V_{x,y,z}$, navigation system (wander $\alpha$) velocity.

AAC, sum of computer $\alpha$ and computer heading. The transformations using PIT, ROL, AAC must be current at high speed navigation rate.

Referring to FIG. 10, the step (5.3) and (5.4) further comprises the steps of:

(5.3.1) transforming the odometer or velocimeter velocity expressed in the body frame into the navigation frame;

(5.3.2) comparing the odometer or velocimeter velocity with the IMU velocity to form a velocity difference; and (5.3.3) integrating the velocity difference during the predetermined interval.

What is claimed is:

1. A self-contained positioning system of a vehicle, comprising:

an inertial navigation system (INS), for sensing a motion of said vehicle to output inertial positioning data including position, velocity, and attitude data and receiving optimal estimates of said inertial positioning data from an integration processor to output compensated inertial positioning data;

a magnetic sensor, for sensing an earth's magnetic field to measure a heading of said vehicle to output a magnetic heading measurement;

an odometer, for measuring a distance traveled when said vehicle is on land; and a velocimeter, for measuring a vehicle speed when said vehicle is in water;

wherein said integration processor derives said optimal estimates of said inertial positioning data by integrating said inertial positioning data, said magnetic heading measurement, said distance traveled, and said vehicle speed and feeds back said optimal estimates of said inertial positioning data to said inertial navigation system to calibrate ever increasing inertial positioning errors.

2. The system, as recited in claim 1, wherein said magnetic sensor is a flux valve.

3. The system, as recited in claim 1, wherein said magnetic sensor is a magnetometer.

4. The system, as recited in claim 1, wherein said inertial navigation system further comprises:

an inertial measurement unit (IMU), for sensing said motion of said vehicle to output digital angular increments and velocity increments signals in response to said motion of said vehicle and an INS processor, for receiving said digital angular increments and velocity increments signals from said IMU and said optimal estimates of said inertial positioning data from said integration processor to output said compensated inertial positioning data.

5. The system, as recited in claim 4, wherein said INS processor runs:

a sensor compensation module, for calibrating errors of said digital angular increments and velocity increments signals; and an inertial navigation algorithm module, for computing said inertial positioning data.

6. The system, as recited in claim 5, wherein said inertial navigation algorithm module further comprises:

a strapdown mathematical platform computation module, for computing a transformation matrix from a body frame to a navigation frame using said digital angular increments and extracting attitude angles from said transformation matrix and compensating errors of said attitude angles using optimal estimates of errors of said attitude data of said inertial positioning data;

a specific force equation module, for transforming said digital velocity increments expressed in said body frame to said navigation frame using said transformation matrix and computing said velocity data of said inertial positioning data and compensating errors of said velocity data of said inertial positioning data using optimal estimates of errors of said velocity data of said inertial positioning data; and a location equation module, for integrating said velocity of said positioning data to obtain said position data of said inertial positioning data and compensating errors of said position data of said inertial positioning data using optimal estimates of errors of said position data of said inertial positioning data.

7. The system, as recited in claim 1, wherein said integration processor further comprises:

a magnetic sensor processing module, for producing a heading angle;

an odometer processing module and a velocimeter processing module, for producing relative position error measurements for a Kalman filter; and a zero velocity update module, for determining if said vehicle stops automatically to perform zero velocity update of said Kalman filter;

wherein said Kalman filter estimates errors of said inertial positioning data by means of performing Kalman filtering computation to calibrate inertial positioning measurement errors.

8. A system for a water and land vehicle, as recited in claim 4, wherein said integration processor further comprises:

a magnetic sensor processing module, for producing a heading angle;

an odometer processing module and a velocimeter processing module, for producing relative position error measurements for a Kalman filter; and a zero velocity update module, for determining if said vehicle stops automatically to perform zero velocity update of said Kalman filter;

wherein said Kalman filter estimates errors of said inertial positioning data by means of performing Kalman filtering computation to calibrate inertial positioning measurement errors.

9. The system, as recited in claim 5, wherein said integration processor further comprises:

a magnetic sensor processing module, for producing a heading angle;

an odometer processing module and a velocimeter processing module, for producing relative position error measurements for a Kalman filter; and a zero velocity update module, for determining if said vehicle stops automatically to perform zero velocity update of said Kalman filter;

wherein said Kalman filter estimates errors of said inertial positioning data by means of performing Kalman filtering computation to calibrate inertial positioning measurement errors.

10. The system, as recited in claim 6, wherein said integration processor further comprises:

a magnetic sensor processing module, for producing a heading angle;

an odometer processing module and a velocimeter processing module, for producing relative position error measurements for a Kalman filter; and a zero velocity update module, for determining if said vehicle stops automatically to perform zero velocity update of said Kalman filter;

wherein said Kalman filter estimates errors of said inertial positioning data by means of performing Kalman filtering computation to calibrate inertial positioning measurement errors.

11. The system, as recited in claim 7, wherein in order to determine whether said vehicle stops, said zero velocity update module comprises:

an odometer change test module, for receiving an odometer reading to determine whether said vehicle stops or restarts;

a system velocity change test module, for comparing a system velocity change between a current interval and a previous interval to determine whether said vehicle stops or restarts;

a system velocity test module, for comparing a system velocity magnitude with a predetermined value to determine whether said vehicle stops or restarts; and an attitude change test module, for comparing a system attitude magnitude with a predetermined value to determine whether said vehicle stops or restarts.

12. The system, as recited in claim 8, wherein in order to determine whether said vehicle stops, said zero velocity update module comprises:

an odometer change test module, for receiving an odometer reading to determine whether said vehicle stops or restarts;

a system velocity change test module, for comparing a system velocity change between a current interval and a previous interval to determine whether said vehicle stops or restarts;

a system velocity test module, for comparing a system velocity magnitude with a predetermined value to determine whether said vehicle stops or restarts; and an attitude change test module, for comparing a system attitude magnitude with a predetermined value to determine whether said vehicle stops or restarts.

13. The system, as recited in claim 9 wherein in order to determine whether said vehicle stops, said zero velocity update module comprises:

an odometer change test module, for receiving an odometer reading to determine whether said vehicle stops or restarts;

a system velocity change test module, for comparing a system velocity change between a current interval and a previous interval to determine whether said vehicle stops or restarts;

a system velocity test module, for comparing a system velocity magnitude with a predetermined value to determine whether said vehicle stops or restarts; and an attitude change test module, for comparing a system attitude magnitude with a predetermined value to determine whether said vehicle stops or restarts.

14. The system, as recited in claim 10, wherein in order to determine whether said vehicle stops, said zero velocity update module comprises:

an odometer change test module, for receiving an odometer reading to determine whether said vehicle stops or restarts;

a system velocity change test module, for comparing a system velocity change between a current interval and a previous interval to determine whether said vehicle stops or restarts;

a system velocity test module, for comparing a system velocity magnitude with a predetermined value to determine whether said vehicle stops or restarts; and an attitude change test module, for comparing a system attitude magnitude with a predetermined value to determine whether said vehicle stops or restarts.

15. The system, as recited in claim 11, wherein said Kalman filter further comprises an error measurement formation module for forming measurements for a state estimator and a state estimator for computing said optimal estimates of said inertial positioning data.

16. The system, as recited in claim 12, wherein said Kalman filter further comprises an error measurement formation module for forming measurements for a state estimator and a state estimator for computing said optimal estimates of said inertial positioning data.

17. The system, as recited in claim 13, wherein said Kalman filter further comprises an error measurement formation module for forming measurements for a state estimator and a state estimator for computing said optimal estimates of said inertial positioning data.

18. The system, as recited in claim 14, wherein said Kalman filter further comprises an error measurement formation module for forming measurements for a state estimator and a state estimator for computing said optimal estimates of said inertial positioning data.

19. The system, as recited in claim 15, wherein said state estimator further comprises a horizontal filter for obtaining estimates of horizontal INS solution data errors and a vertical filter for obtaining estimates of vertical INS solution data errors.

20. The system, as recited in claim 16, wherein said state estimator further comprises a horizontal filter for obtaining estimates of horizontal INS solution data errors and a vertical filter for obtaining estimates of vertical INS solution data errors.

21. The system, as recited in claim 17, wherein said state estimator further comprises a horizontal filter for obtaining estimates of horizontal INS solution data errors and a vertical filter for obtaining estimates of vertical INS solution data errors.

22. The system, as recited in claim 18, wherein said state estimator further comprises a horizontal filter for obtaining estimates of horizontal INS solution data errors and a vertical filter for obtaining estimates of vertical INS solution data errors.

23. A self-contained positioning method of a vehicle, comprising the steps of:

(a) sensing a vehicle motion and producing digital angular increments and velocity increments signals in response to said vehicle motion by an inertial measurement unit, (b) sensing an earth's magnetic field to measure a heading angle of said vehicle by a magnetic sensor, (c) measuring a relative velocity of said vehicle relative to a ground by an odometer, (d) measuring said relative velocity of said vehicle relative to a water by a velocimeter, and (e) deducing position data in an integration processor, using said digital angular increments and velocity increments signals, said heading angle, said relative velocity of said vehicle relative to said ground, or said relative velocity of said vehicle relative to said water.

24. The self-contained positioning method, as recited in claim 23, wherein the step (e) further comprises the steps of:

(e.1) computing inertial positioning measurements using said digital angular increments and velocity increments signals;

(e.2) computing a heading angle using earth's magnetic field measurements;

(e.3) creating a relative position error measurement in an odometer processing module using said relative velocity of said vehicle relative to said ground for a Kalman filter;

(e.4) creating a relative position error measurement in a velocimeter processing module using said relative velocity of said vehicle relative to said water for said Kalman filter; and (e.5) estimating errors of inertial positioning measurements by means of performing Kalman filtering computation to calibrate inertial positioning measurements.

25. The self-contained positioning method, as recited in claim 24, wherein the step (e.3) and (e.4) further comprises the steps of:

transforming said relative velocity of said odometer or velocimeter expressed in a body frame into a navigation frame;

comparing said relative velocity of said odometer or velocimeter with an IMU velocity to form a velocity difference; and integrating said velocity difference during a predetermined interval.

26. The self-contained positioning method, as recited in claim 24, wherein the step (e.5) further comprises the steps of:

performing motion tests to determine whether said vehicle stops to initiate a zero-velocity update, formulating measurement equations and time varying matrix for said Kalman filter, and computing estimates of error states using said Kalman filter.

27. The self-contained positioning method, as recited in claim 25, wherein the step (e.5) further comprises the steps of:

performing motion tests to determine whether said vehicle stops to initiate a zero-velocity update, formulating measurement equations and time varying matrix for said Kalman filter, and computing estimates of error states using said Kalman filter.

* * * * *